US012576788B1

(12) United States Patent
Harris

(10) Patent No.: US 12,576,788 B1
(45) Date of Patent: Mar. 17, 2026

(54) VEHICLE ROOF SUPPORT PLATFORM

(71) Applicant: NSV Group FZCO, Dubai (AE)

(72) Inventor: Victor Harris, Dubai (AE)

(73) Assignee: NSV Group FZCO, Dubai (AE)

( * ) Notice: Subject to any disclaimer, the term of this patent is extended or adjusted under 35 U.S.C. 154(b) by 0 days.

(21) Appl. No.: 19/308,475

(22) Filed: Aug. 25, 2025

(51) Int. Cl.
  B60R 9/00 (2006.01)
  B60R 9/04 (2006.01)
  B60R 9/048 (2006.01)
  B60R 13/07 (2006.01)

(52) U.S. Cl.
  CPC ............... B60R 9/048 (2013.01); B60R 9/04 (2013.01); B60R 13/07 (2013.01)

(58) Field of Classification Search
  None
  See application file for complete search history.

(56) References Cited

U.S. PATENT DOCUMENTS

| | | | | | |
|---|---|---|---|---|---|
| 3,008,784 | A | * | 11/1961 | Allard | B60R 9/055 312/285 |
| 4,433,804 | A | * | 2/1984 | Bott | B60R 9/055 224/328 |
| 7,845,528 | B2 | * | 12/2010 | McMillan | B60R 9/055 224/310 |
| 2009/0001770 | A1 | * | 1/2009 | Baccelli | B60J 7/165 296/210 |

FOREIGN PATENT DOCUMENTS

EP        2210778 A1 * 7/2010 ............ B60R 9/055

\* cited by examiner

*Primary Examiner* — Joseph D. Pape
(74) *Attorney, Agent, or Firm* — Polsinelli LLP

(57) ABSTRACT

Vehicle roof platform with unitary body and load bearing upper surface that is adapted to extend substantially over the roof of a vehicle and is bounded by front and rear and longitudinal sides. Platform mount locations secure the body to vehicle. At least one internal support member extends away from an underside of the upper surface terminating at a lower edge. Respective lower edges of the front and rear ends, the longitudinal sides and the support members distal the upper surface each have a height to conform and index the lower edges to the shape of the vehicle roof such that the upper surface extends in a substantially horizontal plane.

20 Claims, 30 Drawing Sheets

VEHICLE ROOF SUPPORT PLATFORM

FIELD

The invention relates to vehicle support platforms and, in particular, to a vehicle roof support platform.

BACKGROUND

Roof racks or trays are well known and increase the cargo space of a vehicle. This space is in addition to that available in the vehicle cabin or on a utility tray. The rack or tray is attached to the roof of a vehicle, allowing for the transport of additional cargo or oversized objects such as luggage, bicycles and canoes, for example.

Vehicle roof racks are widely used in recreational vehicle activities, particularly camping and other outdoor activities. In addition to bicycles and canoes, it is common for roof racks to be used for retaining spare wheels, fuel and water containers, as well as rooftop tents and retractable awnings that typically run along substantially the entire length of a roof.

Typical roof racks are formed from a pair of spaced apart crossbars mounted at each end to a side of vehicle roof. These can be mounted to existing vehicle rails running along marginal edges or sides of the roof or can be bolted to a roof at existing or pre-drilled mounting points. Additionally, a clamp mechanism can be used to engage with a roof rain gutter running along the side of the edge of the roof, or that tightens against the upper end of a door frame. In each case, the cross-member support leg is pulled towards the gutter/frame providing the entirely of the support for the rack.

Side rails are typically flush with the roof of the vehicle and are strip like, and edges of the crossbars individually or as part of a frame are mounted a predetermined height above the rails or mounting points by using legs of a predetermined height. As noted, the legs are fastened at the roof edge to existing holes, clamp to a gutter or door frame or mount to existing vehicle rails. It is noted that some roof racks are particularly complex in providing a peripheral frame attached to spaced apart cross members which are often in the form of extrusions that require a significant number of fasteners to attach onto the final form.

Most vehicles, particularly 4×4 vehicles used for recreational purposes, are provided with a manufacturer designated vehicle roof load limit. This is designed to ensure the safety of a vehicle in the event of typical driving conditions or collisions, and it is noted the load limit must be complied with for vehicle insurance. Many recreational vehicles have a load limit of 70 kg to 90 kg, and this is to encompass both the roof rack and all items loaded thereon.

The use of camping accessories particularly can lead to significant overloading on the roof. For example, a rooftop tent is typically 70 kg or more in weight, while a roof rack or tray is in the order of 15 kg. While a vehicle awning can increase the weight on the roof rack by an additional 15 kg, a 20 litre fuel container will add at least further 18 kg, and a kilogram will be added for each litre of water stored.

With the weight alone of a medium to large awning equaling or exceeding common roof load limits, it is common to see recreational and other vehicle users with roof racks that significantly exceed manufacturer load limits. Consequently, it is common for roof racks to fail and become detached from a vehicle roof in use such as under hard braking and large wind loads such as from gusts or large vehicles passing in the opposite direction. Failure is often accompanied by damage to the vehicle such as fasteners pulled from the sides of the roof or the mounts deforming, the bending of rain gutters and denting of door frames notwithstanding any damage caused by a rack fully or partially becoming detached and moving across the roof.

SUMMARY

According to an aspect of the invention there is provided a vehicle roof support platform comprising:

a unitary body having a load bearing upper surface adapted to extend substantially over the roof of a vehicle, the upper surface bounded by spaced apart front and rear ends defining a length and spaced apart longitudinal sides intermediate respective ends defining a width;

two or more mount locations spaced apart along each longitudinal side, each mount location adapted for use in securing the body to a vehicle;

one or more spaced apart internal support members extending from an underside of the upper surface a predetermined distance away therefrom and terminating at a lower edge;

respective lower edges of the front and rear ends, the longitudinal sides and the support members distal the upper surface each have a height to conform and index the lower edges to the shape of the vehicle roof such that the upper surface extends in a substantially horizontal plane.

Preferably, the body includes a lower surface extending intermediate the lower edges of the front and rear ends and the lower edges of the longitudinal sides, the lower surface conforming to the shape of the vehicle roof such that the body defines a closed body volume.

It can therefore be seen there is most advantageously provided a vehicle roof support platform that distributes the load across the entire roof, allowing for increased carrying capacity and minimising the load on the mounting points. Further, the platform can also be used as a fluid storage tank having a profile with a relatively low centre of gravity and further stabilising the hollow body of the platform to increase load carrying capacity. This is in addition to the convenience of removing the need for additional external water storage. Conforming the lower end of the platform to the shape of the roof and indexing thereto makes installation of the platform on a vehicle relatively fast and simple.

The invention has been developed primarily with respect to vehicles having a plurality of spaced apart fastening points disposed along opposing sides of a vehicle roof or a rain gutter, will be described hereinafter with reference to these applications. However, it will be appreciated that the invention is not limited to this particular field of use and is applicable to vehicles having a naked roof.

BRIEF DESCRIPTION OF THE DRAWINGS

Preferred embodiments of the invention will now be described, by way of example only, with reference to the accompanying drawings in which.

DESCRIPTION

Figure 1:
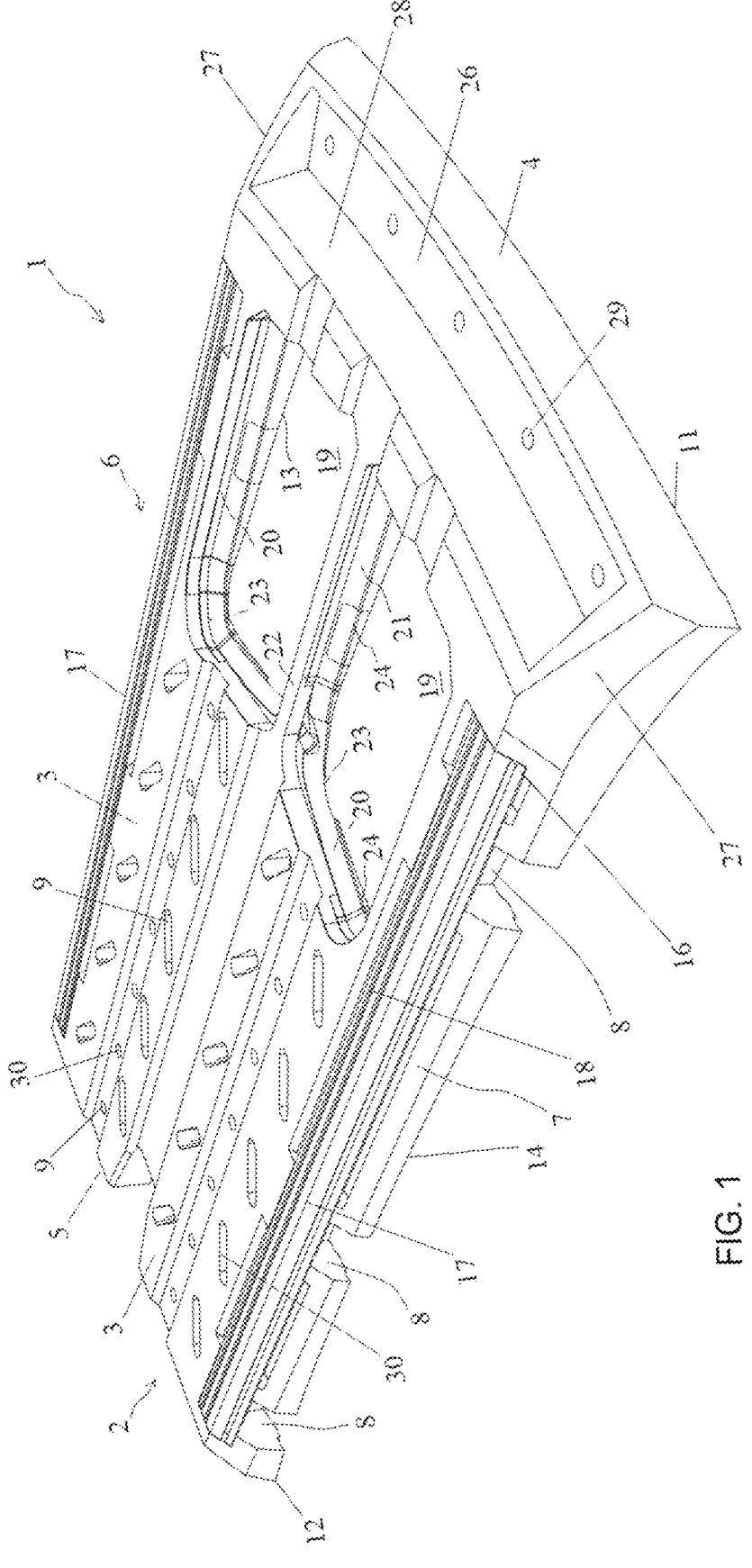
FIG. 1 is an elevated perspective view of a support platform according to a first preferred embodiment.

It is an object of the invention to provide a vehicle support platform that overcome or substantially ameliorates one or more of the disadvantages of the prior art, or to provide a useful alternative.

Referring to the drawings of the preferred embodiments generally, like reference numerals have been used across those embodiments to describe like components and features unless expressly noted otherwise.

Figure 2:
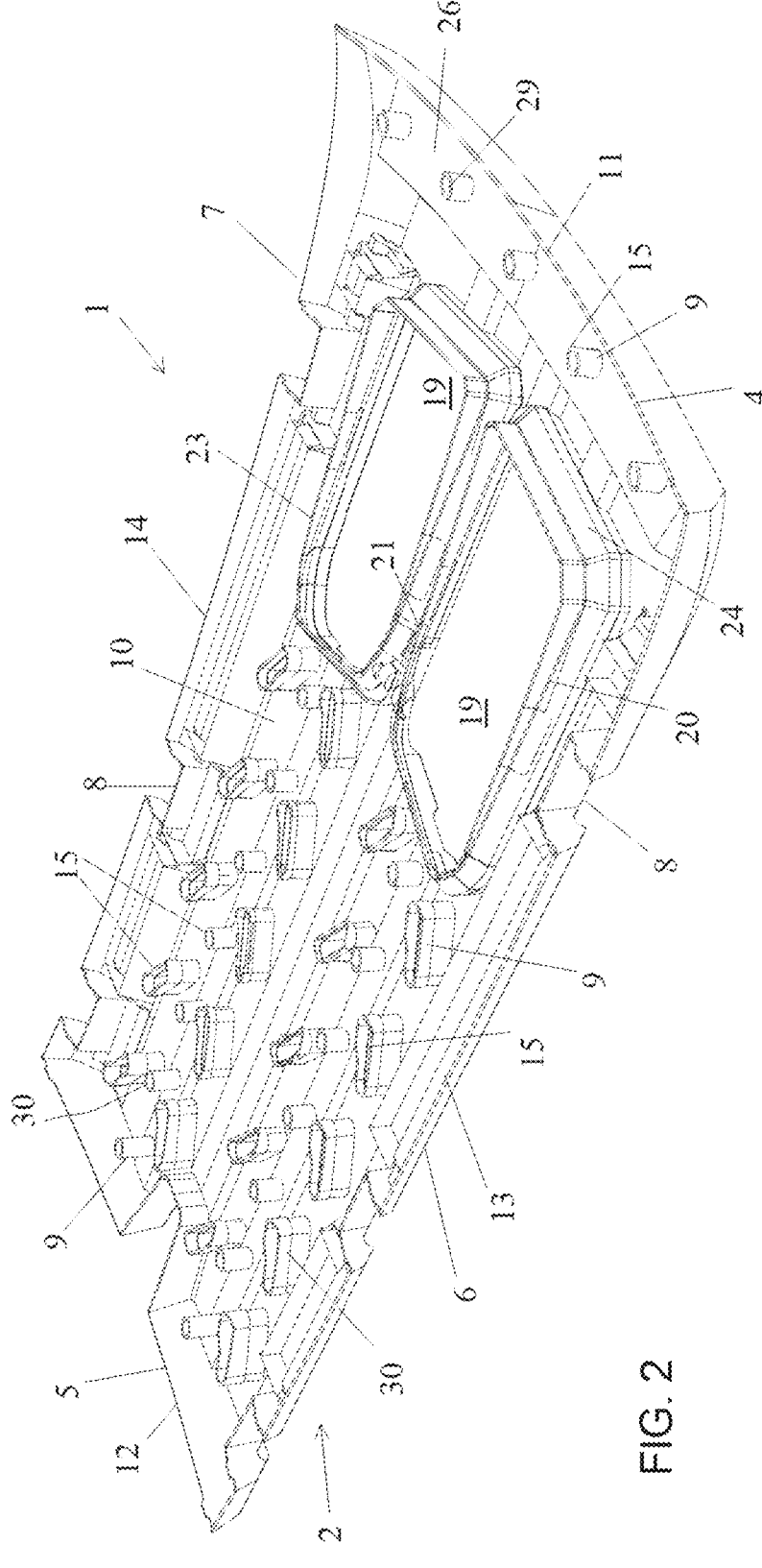
FIG. 2 is an underside perspective view of the platform of FIG. 1.

In FIGS. 1 and 2, there is shown a first preferred embodiment of a support platform 1. The platform 1 includes a body 2 that is moulded from a plastics material. Preferably, the body 2 is moulded from a polypropylene or polyethylene based plastics material using rotational moulding techniques. However, it will be appreciated that any preferred plastics and moulding techniques can be employed including injection moulding, blow moulding and vacuum. Furthermore, it will be appreciated the platform 1 can be formed from a sheet metal material including aluminium being formed, folded and/or stamped.

The body 2 includes an upper surface 3 that is adapted to act as a support platform to receive goods. The upper surface 3 extends substantially over the roof 46 of a vehicle 47 (not shown in FIG. 1, best shown in FIG. 4) extending between a front end 4 and a rear end 5 defining a width intermediate perspective longitudinal left hand 6 and right hand 7 sides.

The body 2 includes mounting portions 8 on each side thereof and in this preferred embodiment includes at least one step portion downwardly from the upper surface 3. The body 2 further includes internal supports 9 that extend from an underside 10 of the upper surface 3 and terminate at a lower edge 15, best seen in FIG. 2. Lower edges 11 and 12 of the front end 4 and rear end 5 as well as lower edges 13 and 14 of the left hand 6 and right hand 7 sides and internal supports 9 extend away from the upper surface 3 to each define a height. The height of each element is predetermined so that the lower edges 11, 12, 13, 14,15 and 23 conform to the shape of a vehicle roof 46 whereby the upper surface 3 is substantially horizontal to receive goods.

Each of the left 6 right hand 7 longitudinal sides include a recess extending from the rear end 5 toward the front end 4 to receive a longitudinal rail 17. The rail 17 is received in the recess 16 so that an upper surface of the rail 18 is disposed substantially in the same plane as the upper surface 3. The preferred embodiment of FIG. 1, the longitudinal rail 17 straddles or projects over the longitudinal sides 6 and 7 from the sides of the upper surface 3. That is, the longitudinal rail 17 extends from over the edge of the upper surface 3 across part of the left 6 and right 7 sides. Rail 17 advantageously distributes load along sides 6 and 7.

The body 2 further includes a pair of cutout portions 19 to allow access or vision through a sunroof mounted in the vehicle roof 46. In the embodiment of FIG. 1, the cutout 19 includes downwardly extending sidewalls 20 projecting away from upper surface 3 a predetermined distance so as to conform to the shape of the vehicle roof at sidewall 20 lower edges 23. A longitudinal dividing member 21 can be made to extend from a rear end to a front end of the cutout 19 as desired.

FIG. 2 illustrates an underside for the support platform 1 where lower edges 11, 12, 13, 14 and 15 each terminate a distance away from surface 10 to correspond to the shape of vehicle roof 46 so that upper surface 3 is disposed substantially horizontally to receive goods thereon. It can be seen the array of internal supports 9 with apertures 30 assist in distributing load on surface 3. Further, lower edges 23 of the sidewalls of cutout portions 19 also preferably conform to the shape of the vehicle roof.

Figure 3:
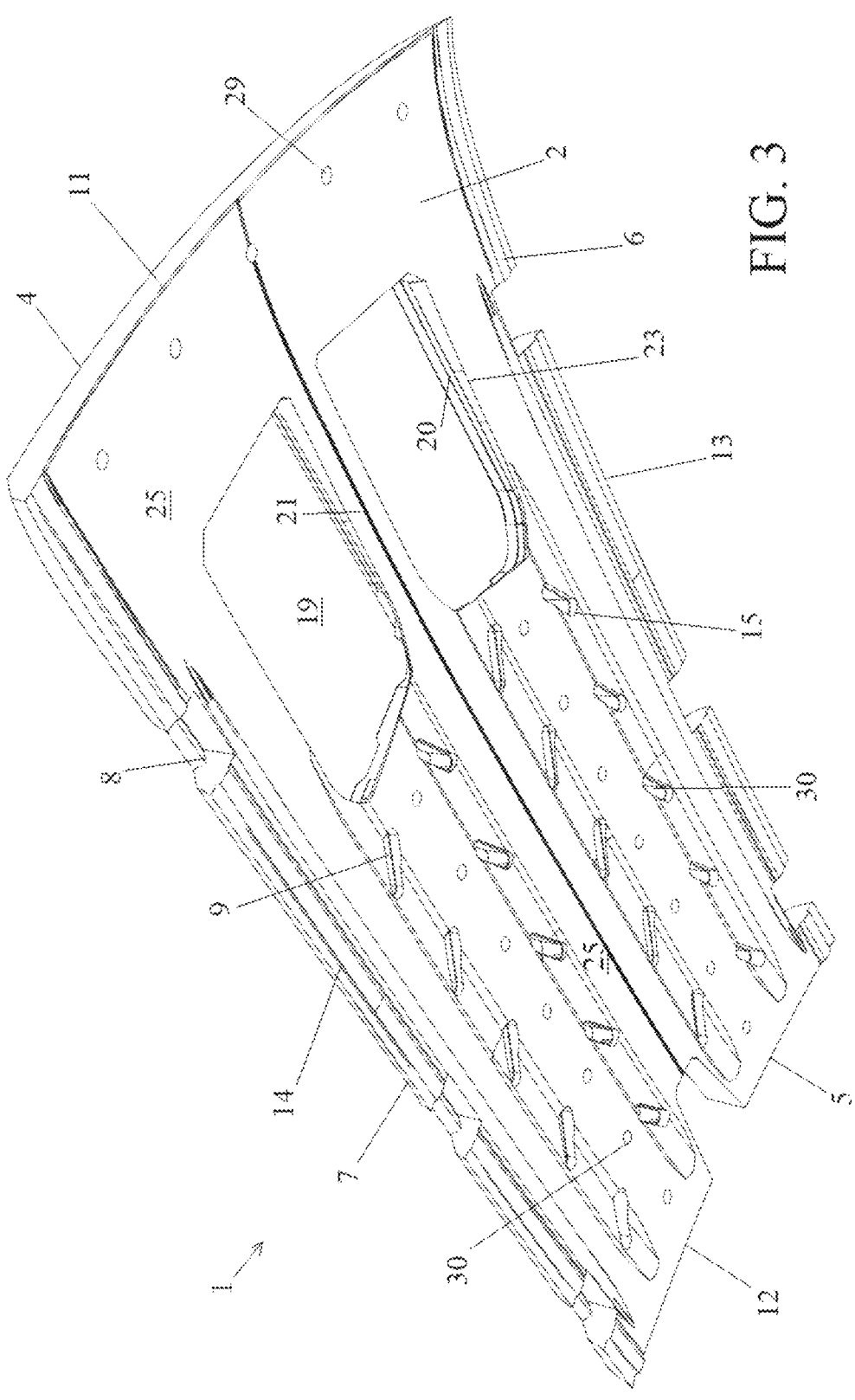
FIG. 3 is an underside perspective view of the platform of FIG. 1, according to a second preferred embodiment.

FIG. 3 shows an alternative embodiment of the platform 1 of FIG. 1 and includes a lower surface 25 disposed intermediate the lower edges 11 and 12 of the front 4 and rear 5 ends and the lower edges 13 and 14 of the left 6 and right 7 hands longitudinal sides. Surface 25 conforms to the shape of the roof of the vehicle to allow the body 2 to be indexed to the roof and be contiguous across substantially the entire roof. The lower edges 15 of supports 9 and the lower edges 23 of the cutout portion 19 also extend a predetermined height terminating at lower surface 25 to conform to the shape of roof 46 to maintain the upper surface 3 substantially horizontal.

It will be appreciated that platform 1 in the embodiment of FIG. 3, the lower surface 25 provides a closed volume within the body 2 about the cutout and the perimeter of the body 2. This allows support platform 1 to store fluid including water in the enclosed volume intermediate the upper 3 and lower 25 surfaces where the volume of fluid is distributed across lower surface 25.

FIG. 1 also shows the body 2 having an integral front platform 26 extending back from front end 4. Platform 26 is in the form of a shelf that is substantially enclosed by side portions 27 and a rear portion 28 extending intermediate the longitudinal sides 27. The shelf portion 26 is adapted for mounting lights 51 or other auxiliary equipment such as cameras to the front of the platform 1. Apertures 29 are also provided in the shelf 26 which can be used to attach auxiliary equipment on the shelf 26 for example by directly tapping or using embedded threaded anchors, for example.

It is noted that upper surface 3 intermediate the longitudinal sides 6 and 7 the internal supports 9 are in the form of a plurality of tie point apertures 30 disposed in an array across the upper surface 3 from adjacent the rear end 6 toward the cutout 19. It can be seen apertures 30 are in the form of circular holes and slots although any desired shape could be provided, as described further below.

Referring now to FIGS. 4 to 8, there is shown another preferred embodiment of the support platform 1. In this embodiment, the body 2 includes a cutout portion 19 without any cutout longitudinal dividing rail 21. This embodiment also does not include longitudinal rails 17 although they could be included if desired (see FIG. 16). Body 2 includes a plurality of spaced apart cross member recesses 32. The cross member recesses 32 extend intermediate left hand 6 and right hand 7 longitudinal sides and are spaced along the roof length from front to rear. It is noted that front cross member recess 32 extends adjacent each longitudinal side 6 and 7 but does not extend across the cutout 19 whereby these front recesses 32 are aligned.

Recesses 32 are configured to receive cross members 33 formed in the preferred embodiment from extruded aluminium length. The cross members 33 are received within recesses 32 and are retained in a keyed engagement so that upper surfaces 34 of each cross member 33 are disposed substantially in the plane of the upper surface 3 of the body 2 to form a substantially continuous surface. Each end of the cross member recesses 32 include an end cap 35.

Figure 7:
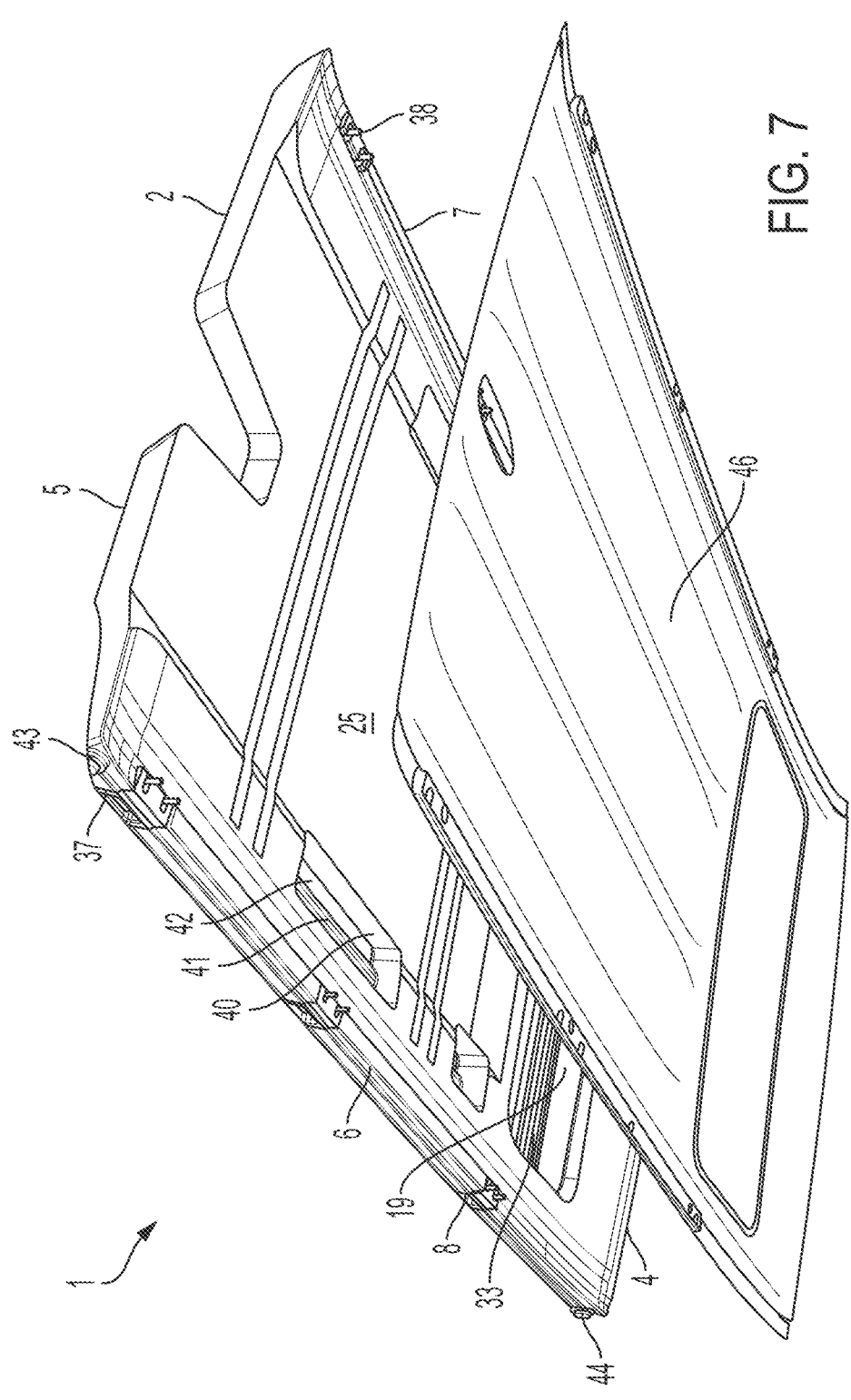
FIG. 7 is an underside perspective view of the support platform of FIG. 4.

In upper surface 3 and intermediate pairs of cross members 33 and adjacent each side 6 and 7 there are provided recess portions 40 disposed in upper surface 3. Portions 40 include aperture portions 42 therethrough as best seen in FIG. 7, however, the recess portions 40 at a lower end can terminate at recessed upper surface 3. In this preferred embodiment, bridging member 41 extends across each portion 40 substantially parallel with the longitudinal side 6 and 7. The bridging members 41 can be used as handles for manipulating the platform 1 or alternatively as tie-down points for goods loaded onto the body 2 upper surface 3.

In this preferred embodiment, the body 2 includes lower surface 23 forming a closed volume within the body 2. This is preferably configured to receive water for storage and includes outlet apertures 43 and 44. Although not illustrated, it will be appreciated that a fill cap or similar can be disposed in the upper surface 3, similarly a breather valve or pressure relief valve can be added as desired.

Figure 8:
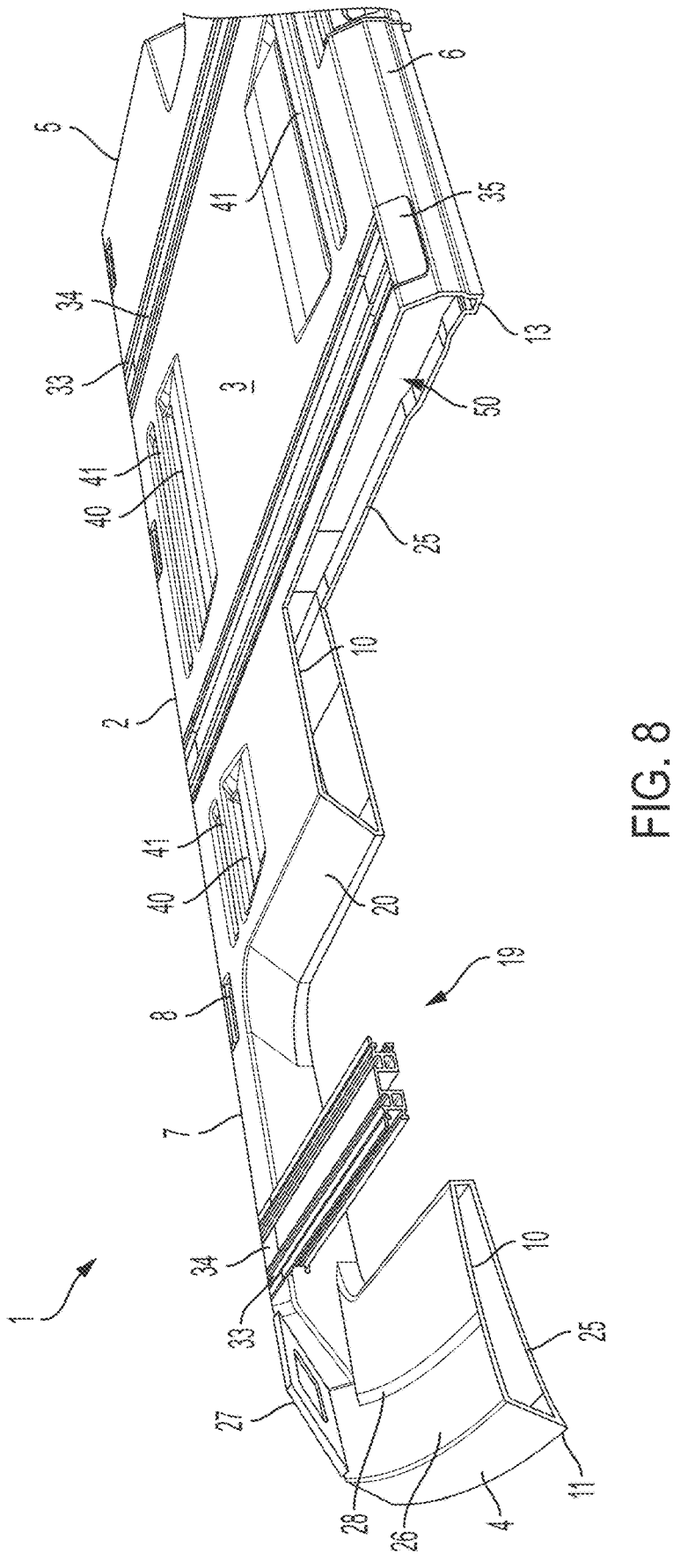
FIG. 8 is a partial cutaway elevated perspective of the support platform of FIG. 4.

It can be seen that part of recess portions 40 extend entirely through body 2 and lower surface 25, as noted above and seen in FIG. 7. This also shows the lower surface 25 conforming to the shape of the roof 46 of a vehicle 47. FIG. 8 shows a partial cutaway view of the platform of FIG. 4. Here, a baffle element 50 is shown extending partially across the body 2 in the enclosed volume but this could be oriented longitudinally in addition or alternatively. It will be appreciated that any preferred baffle arrangement can be provided including use of the recess portion 40 or internal supports 9 to provide same. Alternatively, it will be appreciated that baffles may not be required if the profile of the body 2 is sufficiently low.

Turning now to FIGS. 9 to 15, there is shown a further preferred embodiment of the platform 1. This embodiment, the internal supports 9 are substantially hollow and include an internal radially outward step portion best shown in FIG. 2) toward a lower end thereof. Each internal support 9 defines an aperture 30 which can receive a tie down member (not illustrated) for securing goods disposed on the upper surface 3. Each internal support 9 provides structural strength intermediate the upper surface 3 and lower surface 25 retain relatively heavy goods thereon in addition to providing a tie point for goods disposed over the upper surface 3.

It is noted that upper surface 3 can include a plurality of spaced apart outwardly projecting raised members such that platform 1 can be removed from roof 46 and be used as a rescue tread device. Additionally, or in the alternative, apertures 30 can receive insert members that raise above surface 3 to provide an enhanced traction surface.

Further in this preferred embodiment, the cutout portions 19 include retaining means 53 to retain the containers 2 within the cutout 19. The retaining means 53 are preferably rotatably mounted clips. However, containers 52 can include fluids with an appropriate fill aperture on an upper surface 54 where surface 54 is in substantially the same plane as the upper surface 3.

Figure 9:
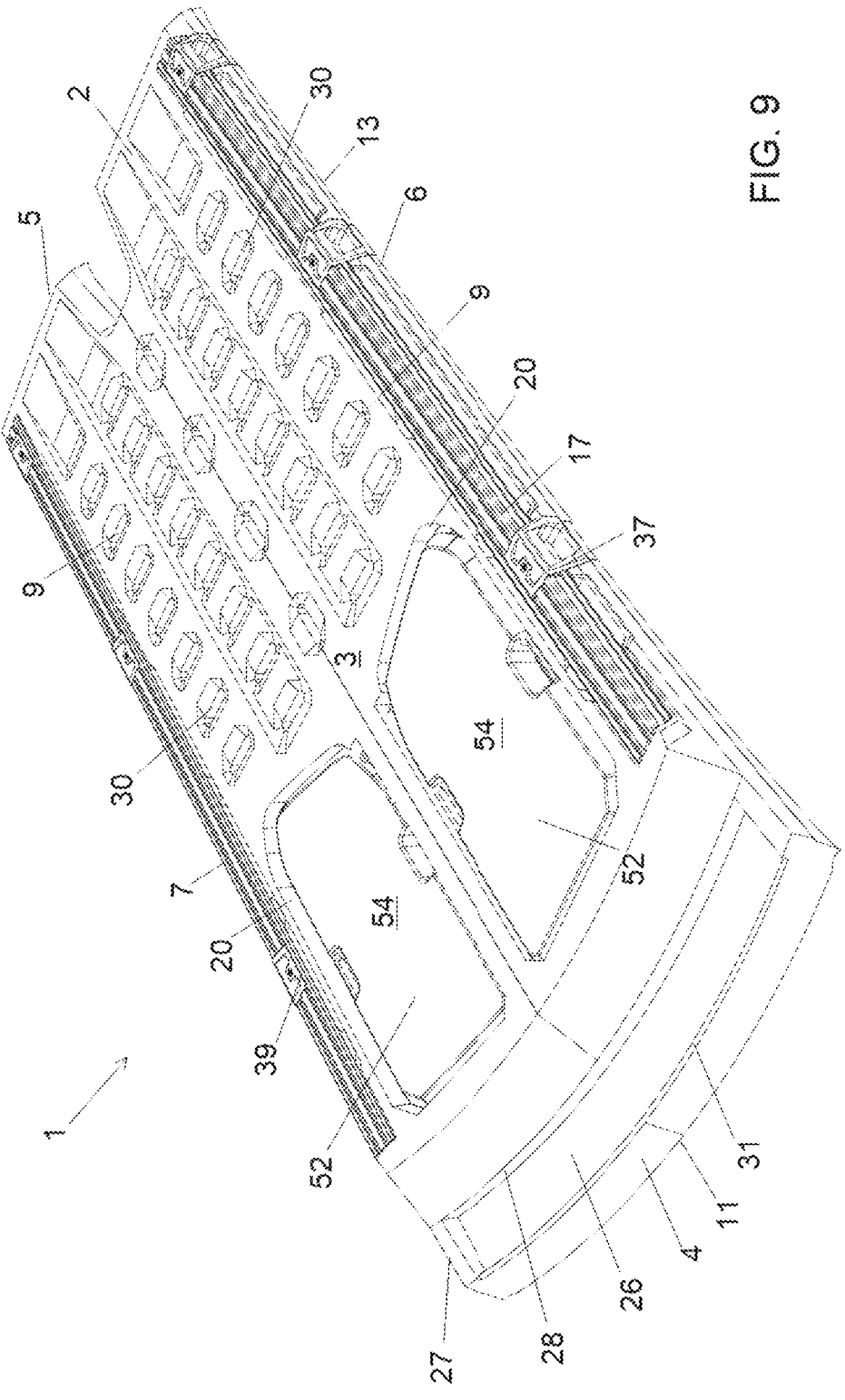
FIG. 9 is an elevated perspective view of a support platform according to a fourth preferred embodiment.
Figure 10:
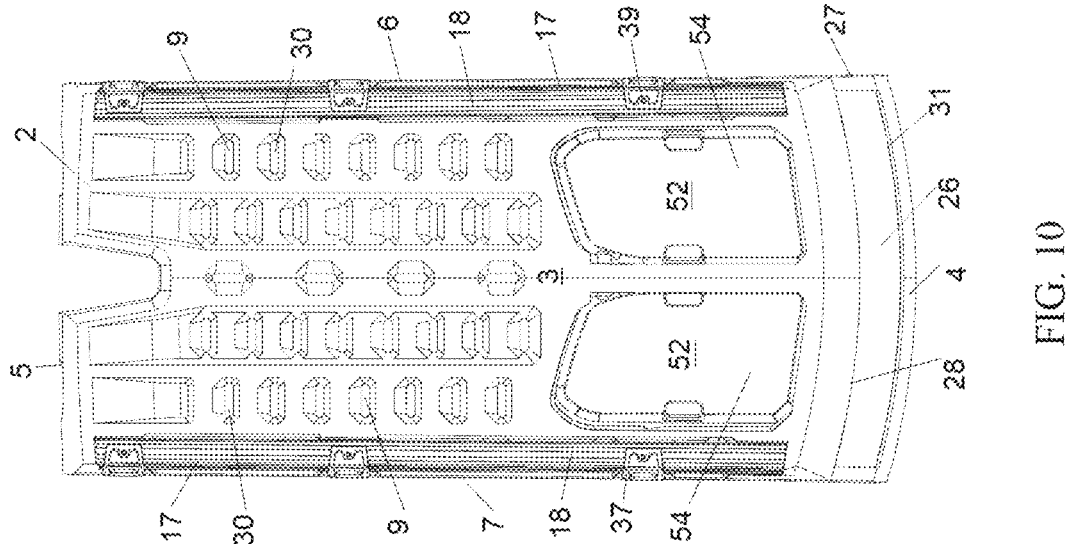
FIG. 10 is a top view of the support platform of FIG. 9.
Figure 11A:
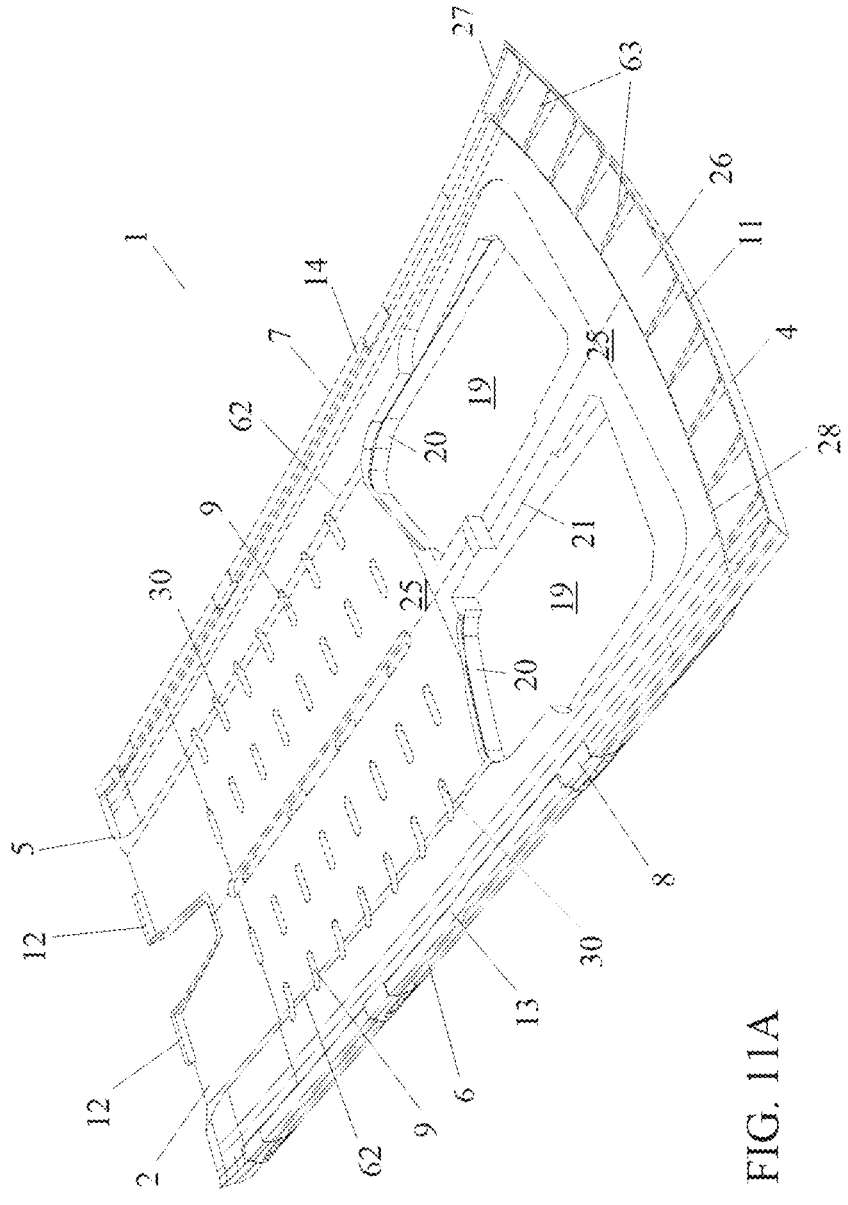
FIG. 11A is an underside perspective view of the support platform of FIG. 9.
Figure 11B:
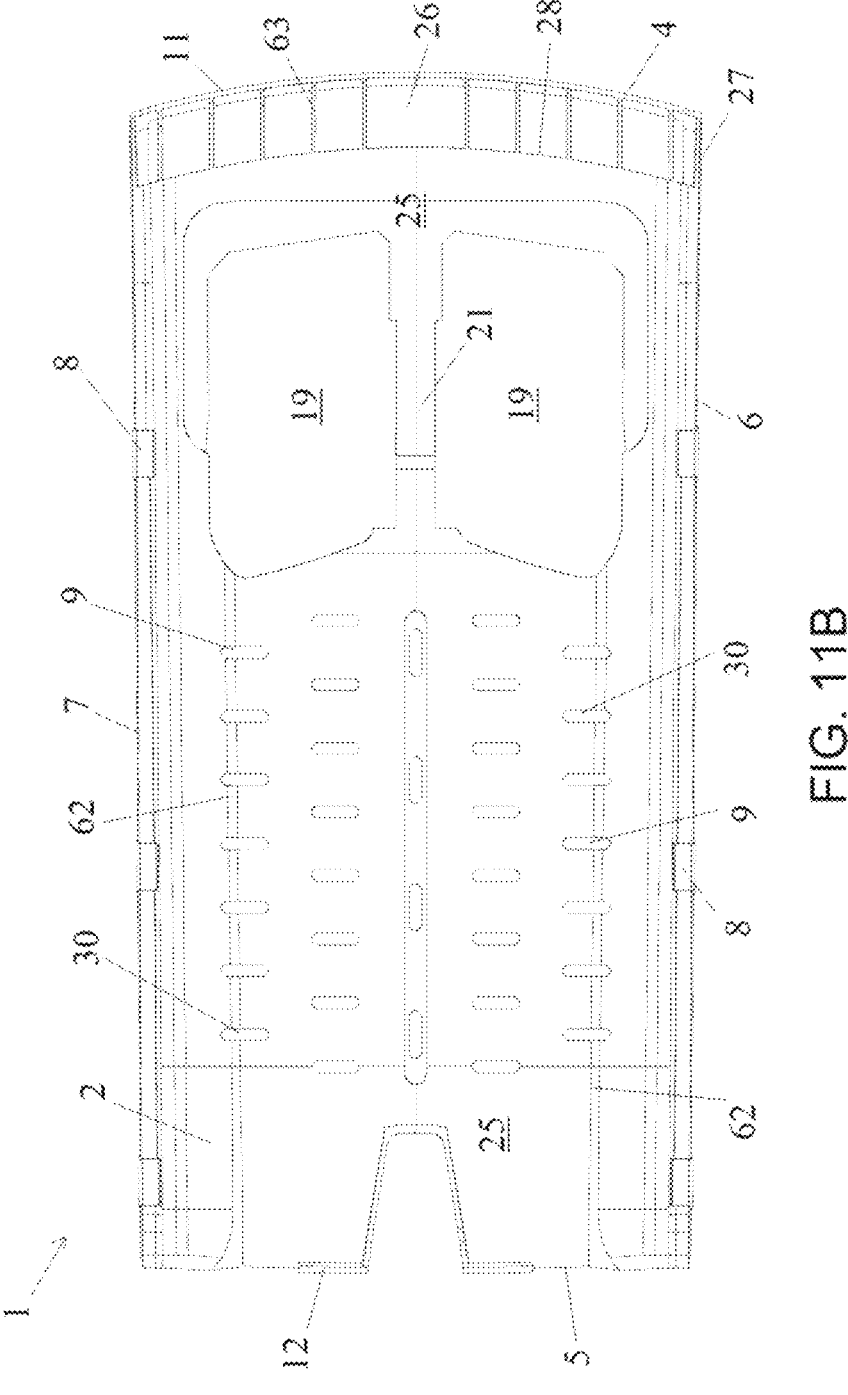
FIG. 11B is an inverted plan view of the support platform of FIG. 9.

FIGS. 11A and 11B respectively show an underside perspective and inverted plan view of the support platform of FIG. 9. Each view shows a pair of drainage channels 62 extending from a rear of each cut out portion 19 to the rear end 5. Channels 62 are U-shaped and project upwardly into lower surface 25 to allow any water entering from ends 4 or 5, sides 6 or 7, cutouts 19 or apertures 30 between lower surface 25 and roof 46 a path to escape. FIG. 11 also illustrate strengthening ribs 63 on a lower face under platform 26. Ribs 63 are spaced apart across the front end 4 and each extends from front end 4 to platform rear 28.

Figure 12:
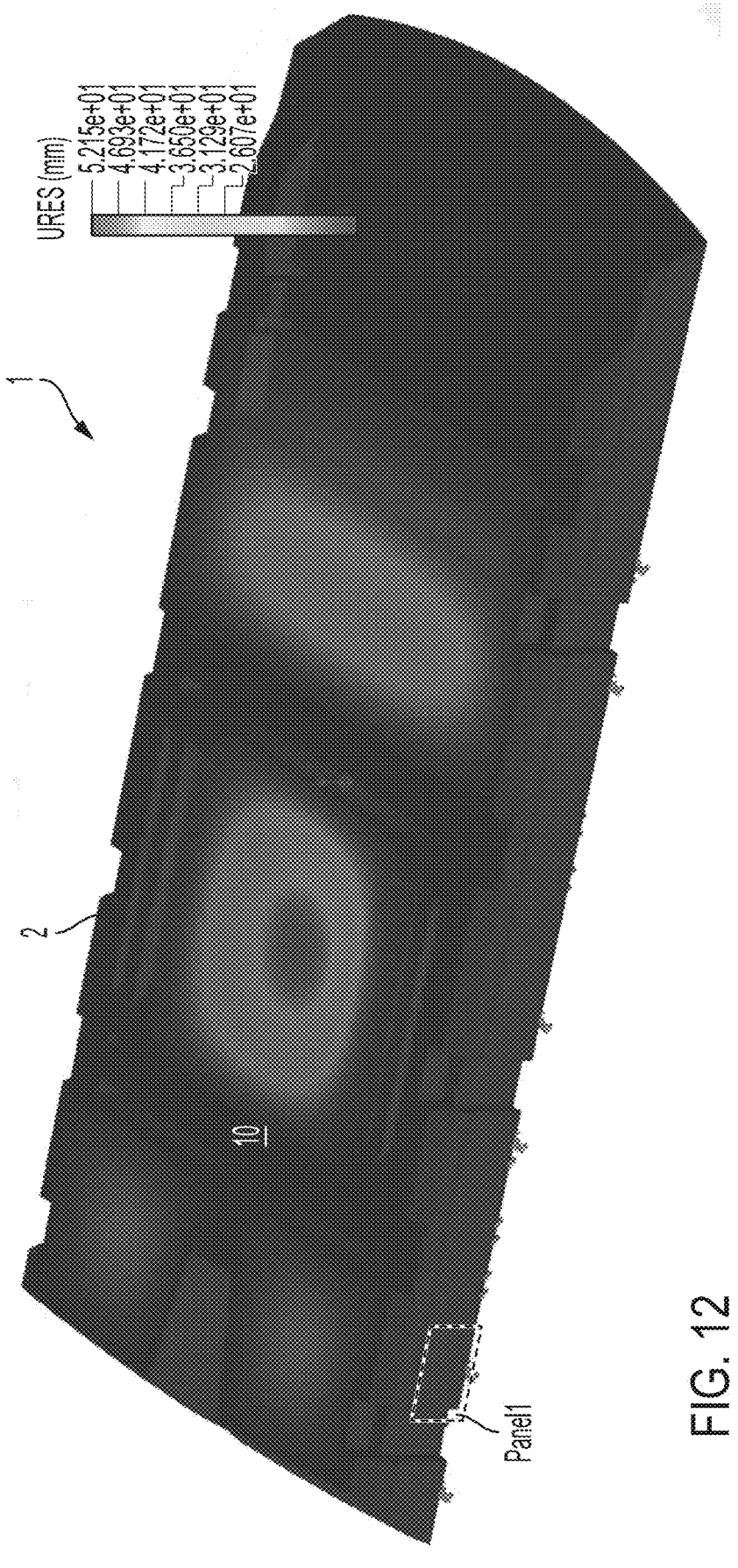
FIG. 12 is an underside perspective view showing a simulated heat pressure map of the underside of the support platform of FIG. 9.
Figure 13:
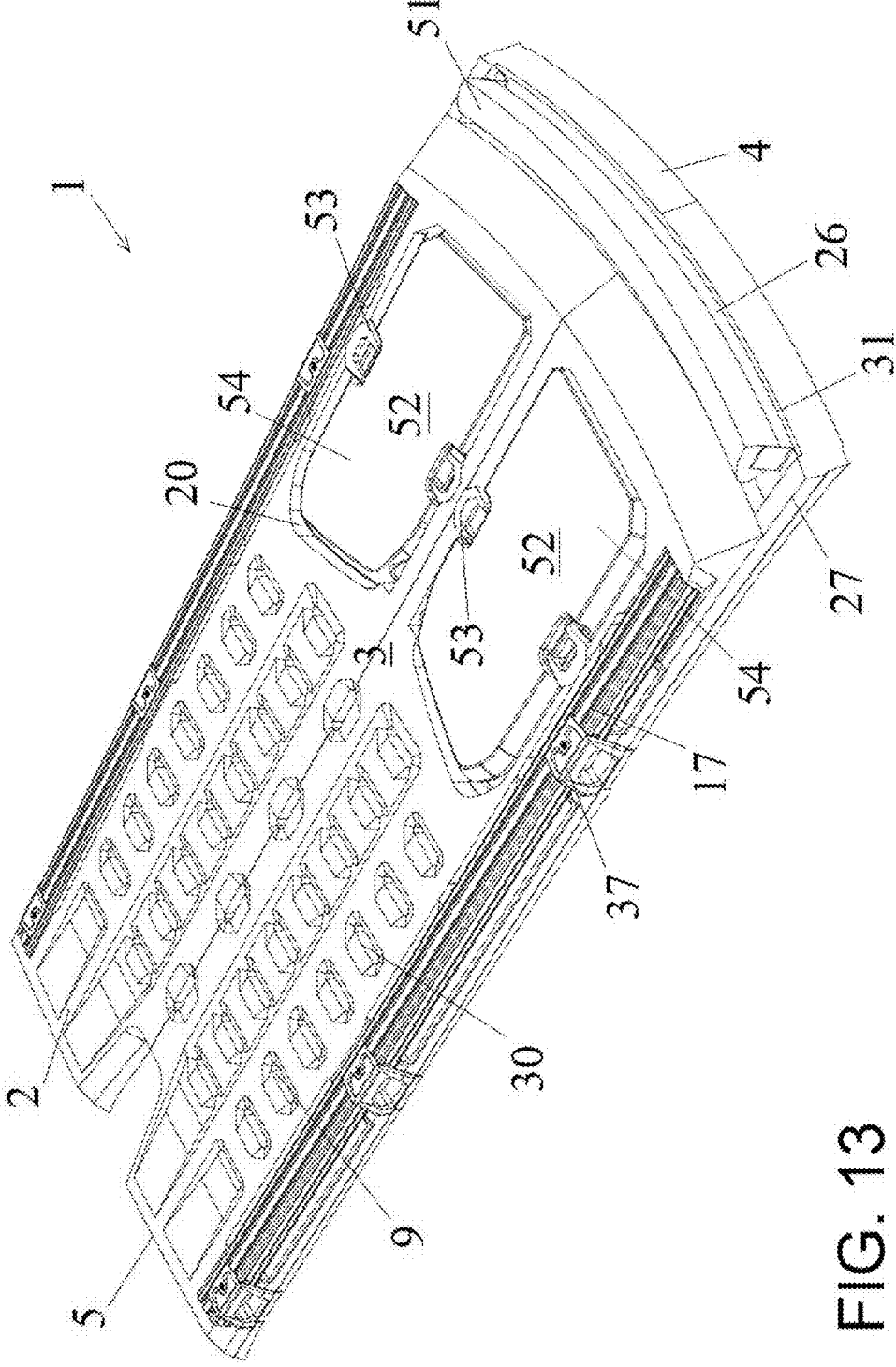
FIG. 13 is an elevated perspective view of the support platform of FIG. 9 with a light bar attachment.

FIG. 12 shows a simulated heat map of the pressure applied by the lower surface 25 of the body 2 over a roof surface without use of internal supports 9. Here it is seen that support is preferably employed from rear of the cutout portions 19 towards the rear end 5 to most efficiently distribute load across lower surface 25. This support is preferably provided by the internal supports 9 having substantially vertical sidewalls. However, this support could be provided by baffles 50 intermediate the upper 3 and lower 25 surfaces.

Figure 4:
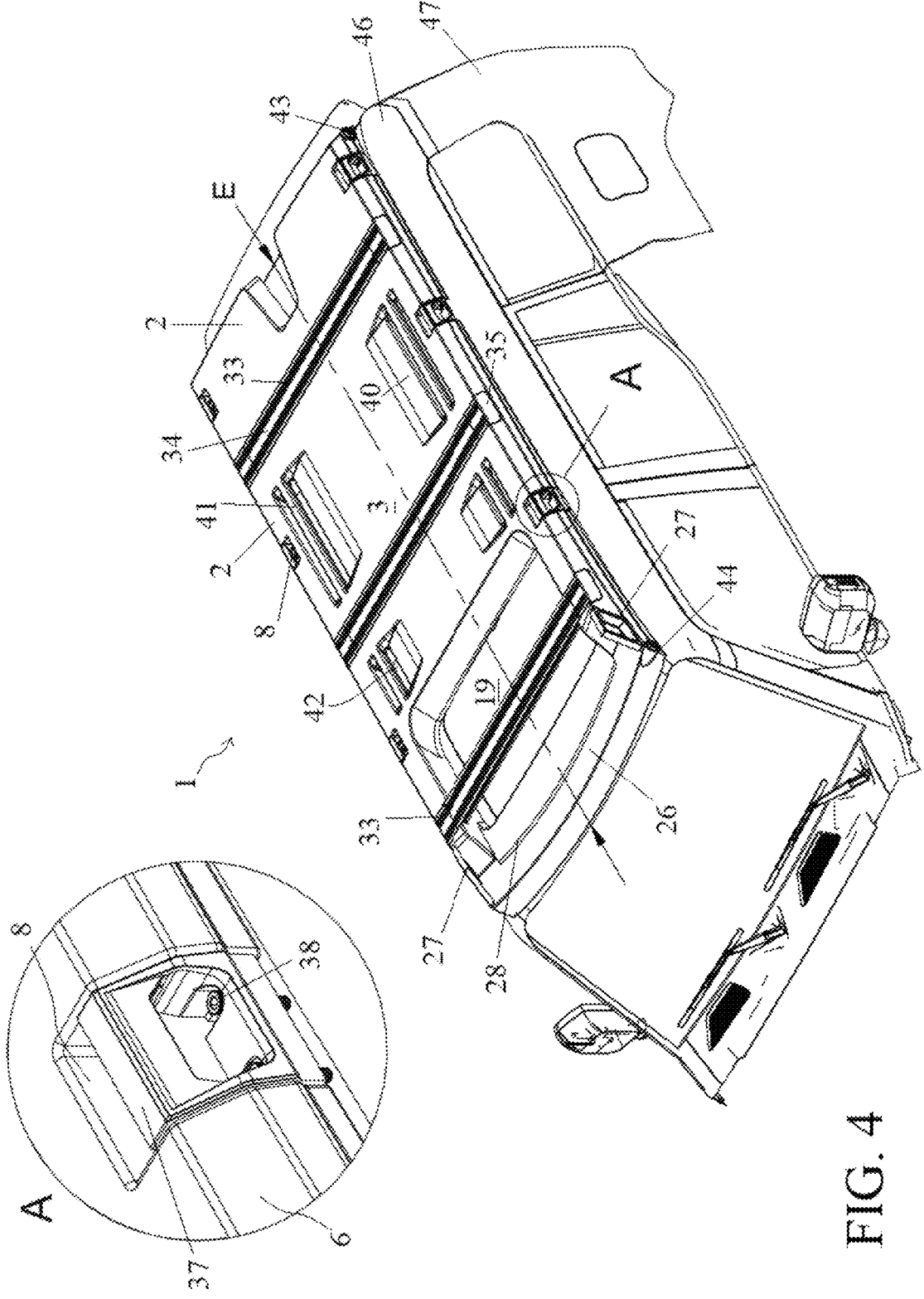
FIG. 4 is an elevated perspective view of a third preferred embodiment of the support platform.
Figure 5:
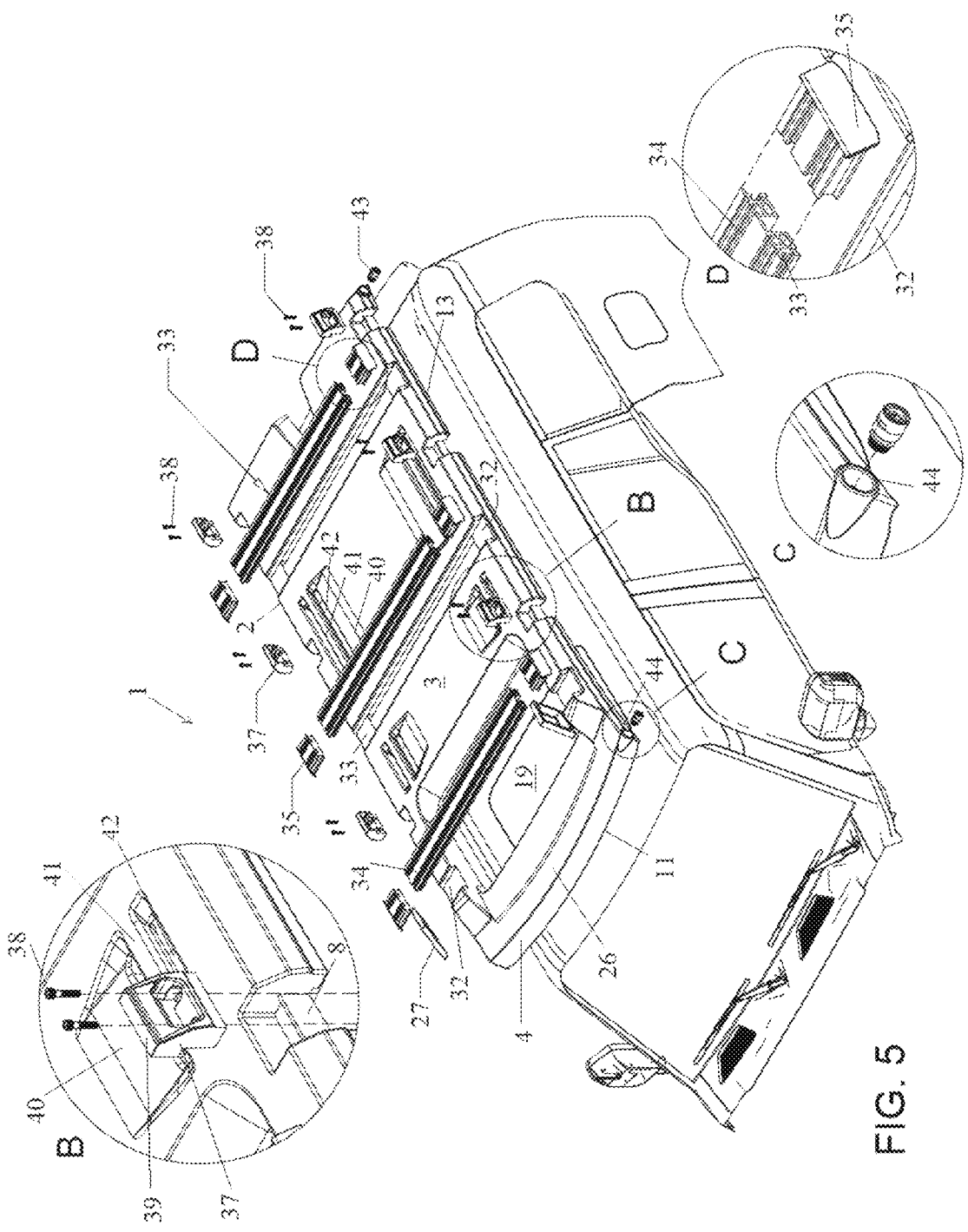
FIG. 5 is an exploded view of the support platform of FIG. 4.
Figure 6:
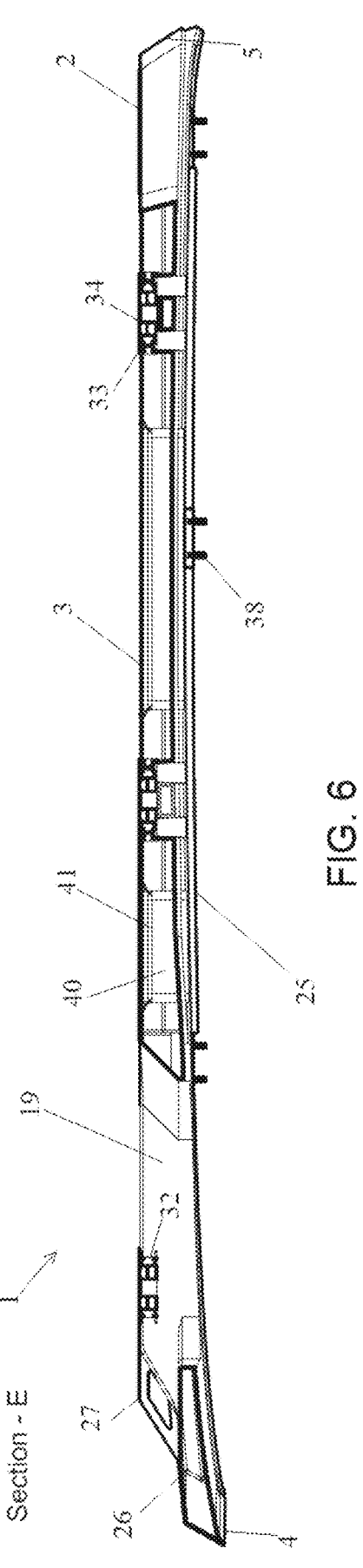
FIG. 6 is a cross-sectional view of the support platform of FIG. 4.
Figure 14:
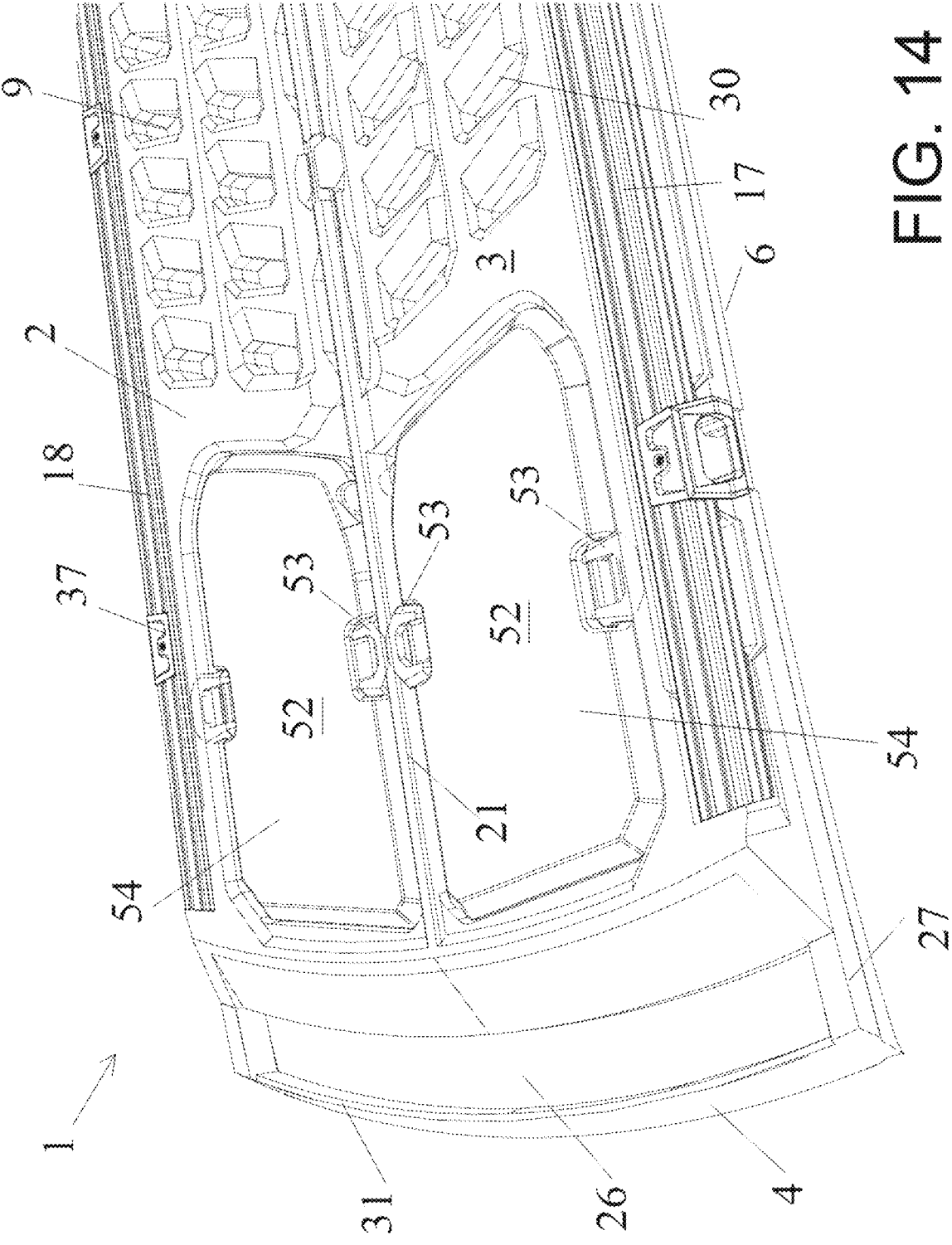
FIG. 14 is an elevated perspective view of part of the support platform according to a fifth preferred embodiment.
Figure 15:
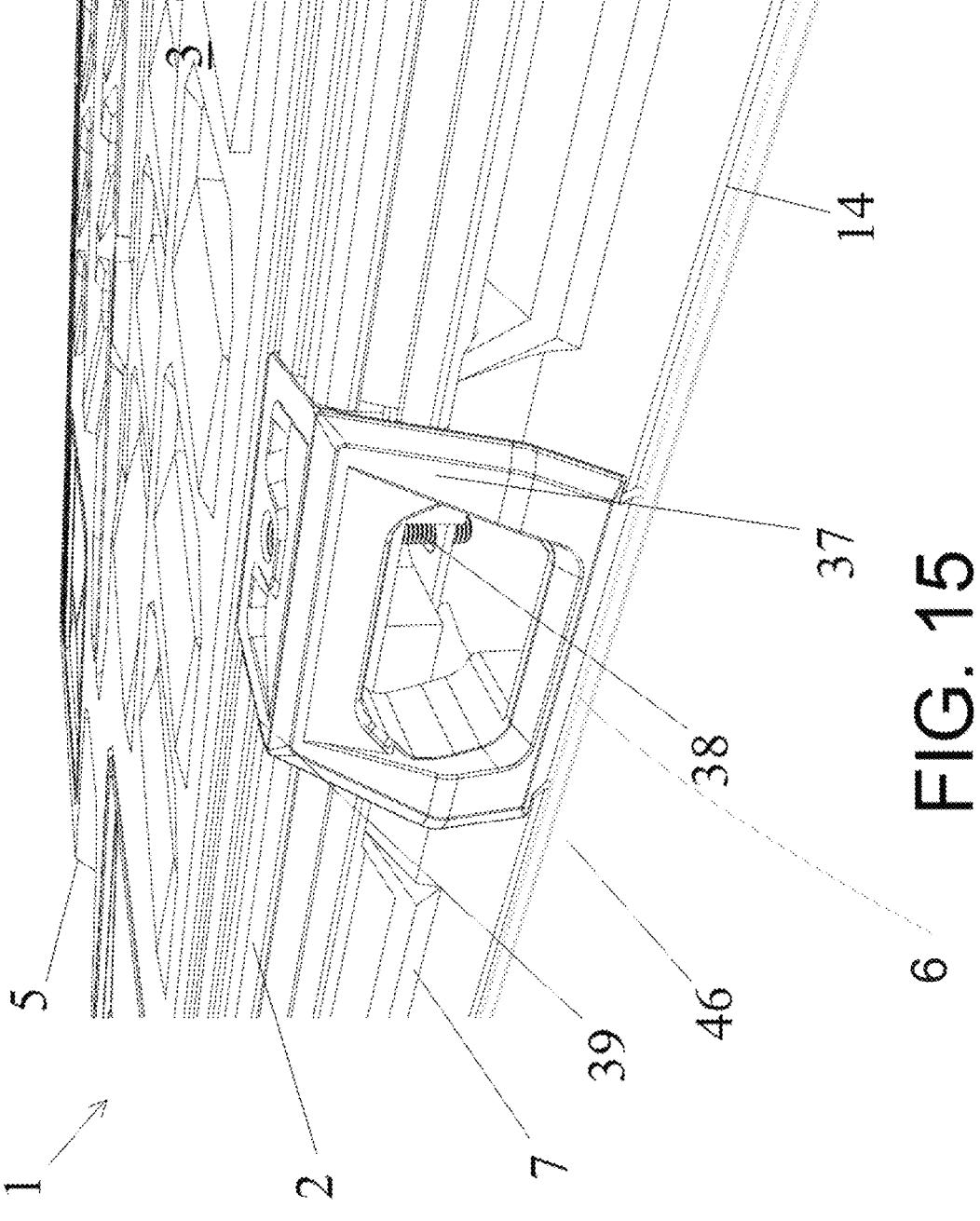
FIG. 15 shows part of the support platform of FIG. 9 illustrating a mounting point.

FIGS. 14 and 15 additionally show upper rail 17 mounting brackets 37 that are received over upper surface 18 of rail 17 and secured to the body 2 at mounting portions 8 on each of the left and right hand longitudinal sides 6 and 7. Mounting portions 8 are secured to the roof, for example, such as shown in FIG. 4. Upper rail mounting bracket 37 at an end is configured to receive a fastener 38 therethrough to secure the mounting bracket 37 to or through rail 19 to body 2 on upper surface 3 adjacent side surface 6 or 7. As shown, bracket 37 has an upper surface 39 in substantially the same plane as the upper surface 3.

It will be further appreciated that the cutout side walls 20 extending intermediate the upper surface 3 and lower surface 25 provide significant loading strength thereon, additionally with the sides 6 and 7 of the body 2. In addition to internal supports 9, the weight of goods loaded on upper surface 3 is evenly distributed over the roof of the vehicle to advantageously minimise the loading forces endured by the mounting points of the platform 1 to the vehicle (whether fasteners into the roof, connecting to raised rails the rain gutter or the upper part of the vehicle door frame).

In this preferred embodiment, it can also be seen that the body 2 includes a shelf 26 which includes a front lip portion 31 across the shelf.

Figure 16:
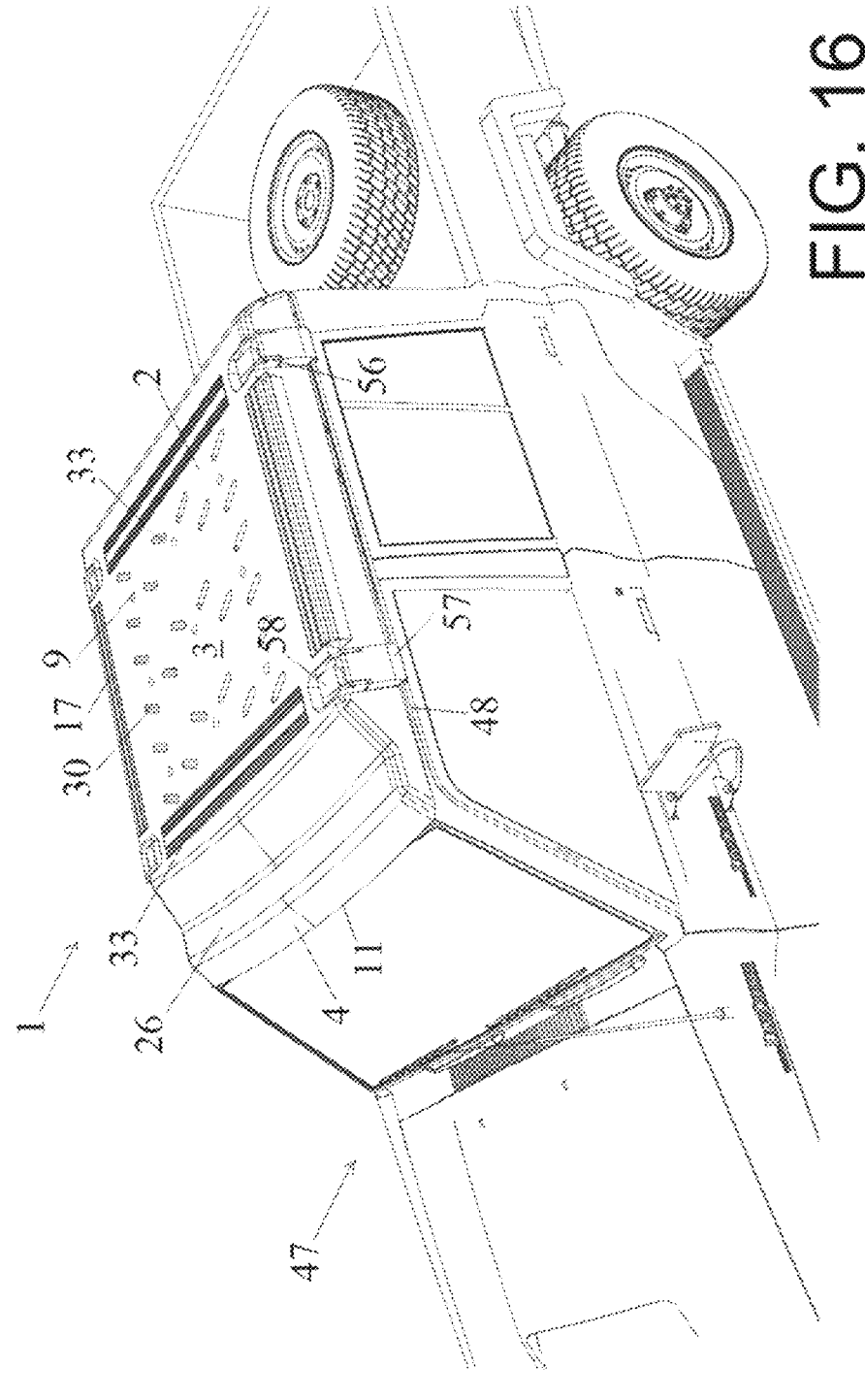
FIG. 16 shows a support platform in elevated perspective view according to a sixth preferred embodiment.
Figure 17:
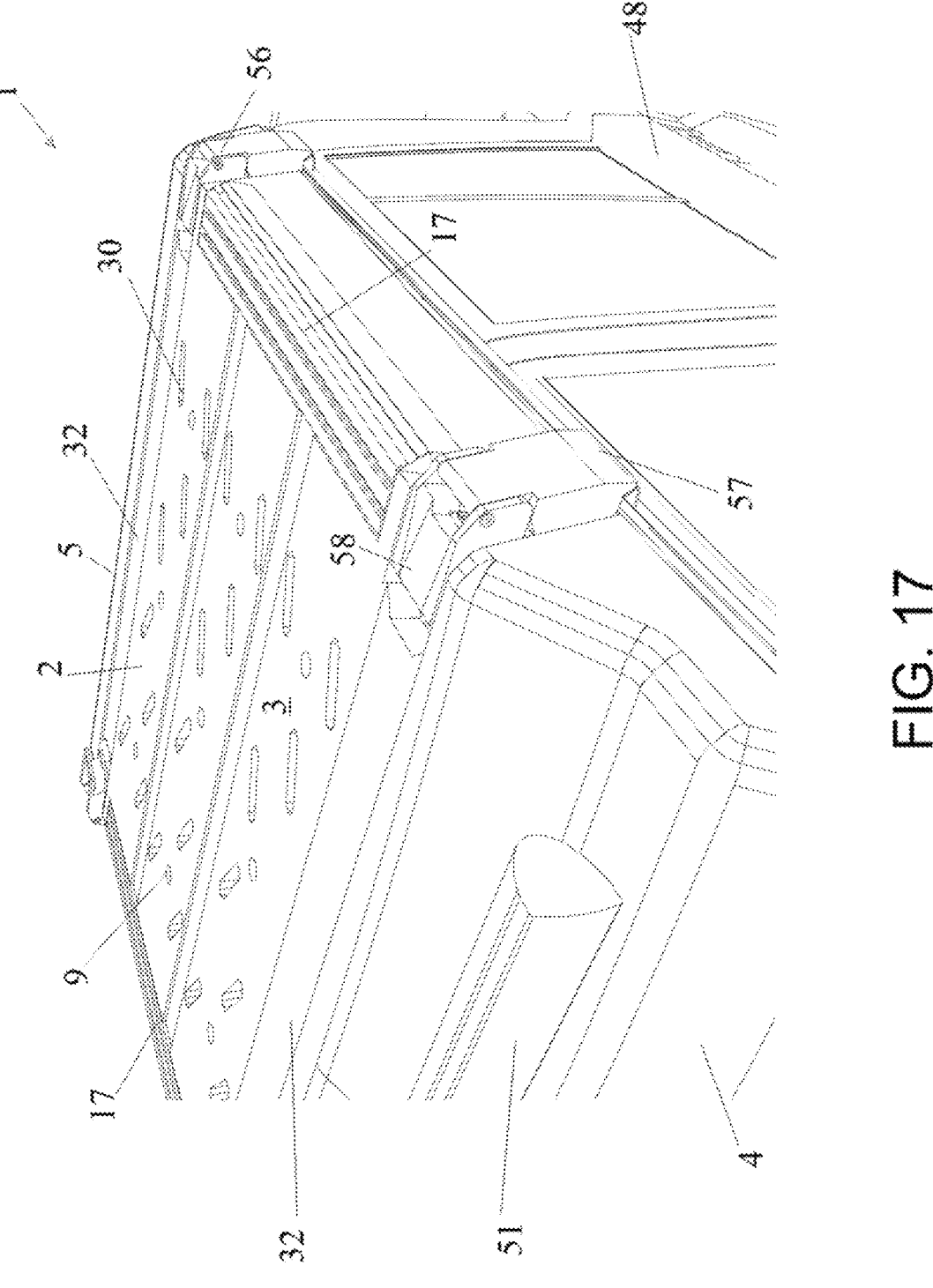
FIG. 17 shows a perspective view of part of the platform of FIG. 16 with alternative upper surface.

Referring to FIG. 16, there is shown another preferred embodiment of the platform 1. Here, shelf 26 is not bounded at the sides and no cutout portion 19 is provided. Both longitudinal rails 17 and cross member rails 33 are provided in respective recesses 16 and 32 so as to have upper surfaces being 18 and 34 in substantially the same plane as the upper surface 3.

Body 2 includes clips attaching the mounting portions 8 to a rain gutter 48 of a vehicle 47. In this embodiment, one end 57 of a clip 56 engages with mounting portion 8 and the other end 58 engages with an underside of the rain gutter 48. A clip handle is moved into an over centred locking position to retain the body 2 to the roof 46 of the vehicle. Advantageously, the lower surface 25 distributes load of the platform 1 across the entire roof of the vehicle conforming to same and providing additional resistance to movement.

Although not shown in this embodiment, body 2 can be used as a fluid tank by the addition of an appropriate fill point and/or apertures similarly to the embodiment of FIG. 4. In this way, the volume intermediate the upper 3 and lower 25 surfaces including shelf portion 26 can be used to contain a fluid such as water. Baffles may be included in addition to the internal walls of circular apertures and slots 30.

Figure 18A:
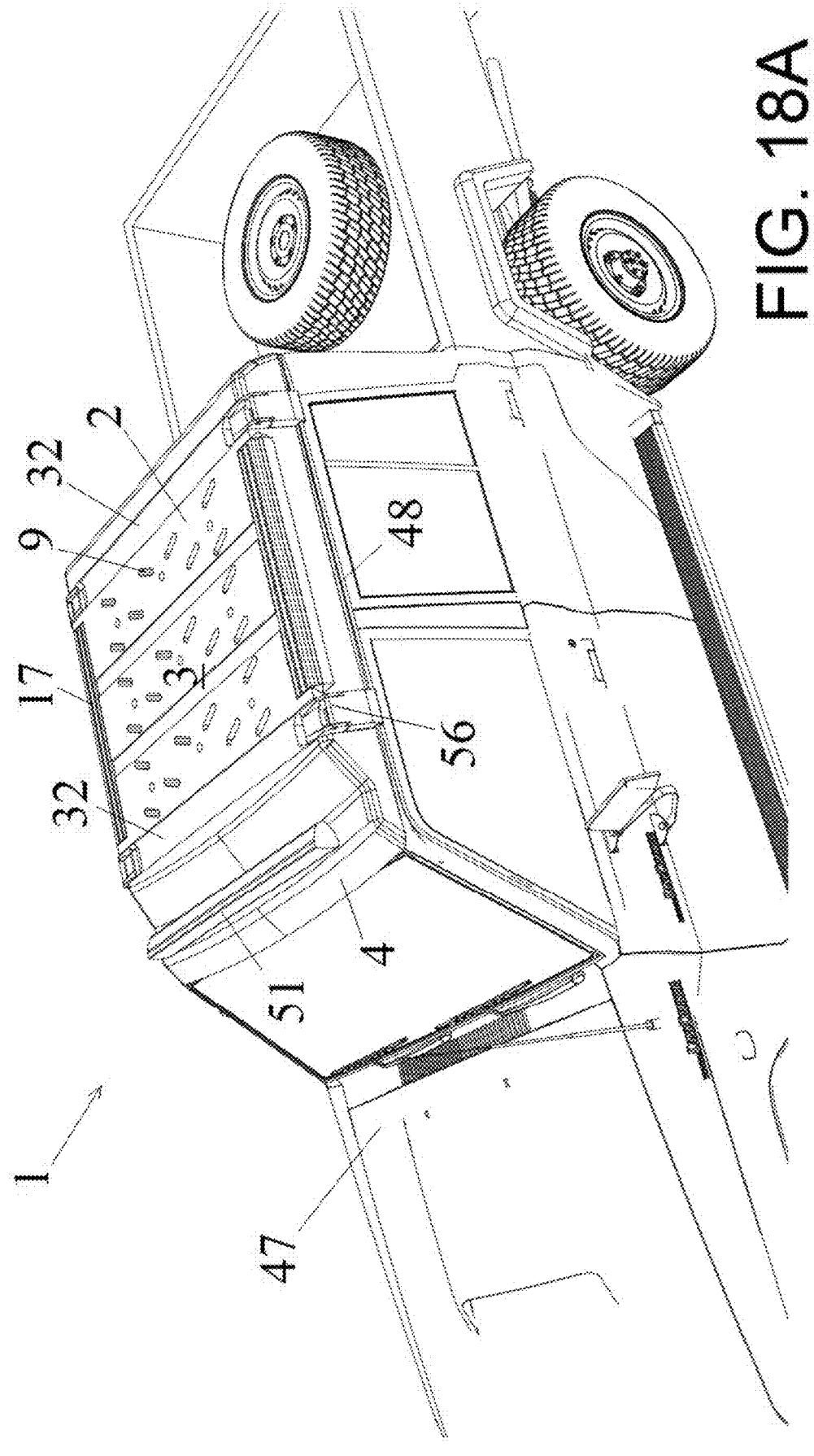
FIG. 18A shows a perspective view the support platform of FIG. 17 with a light bar.
Figure 18B:
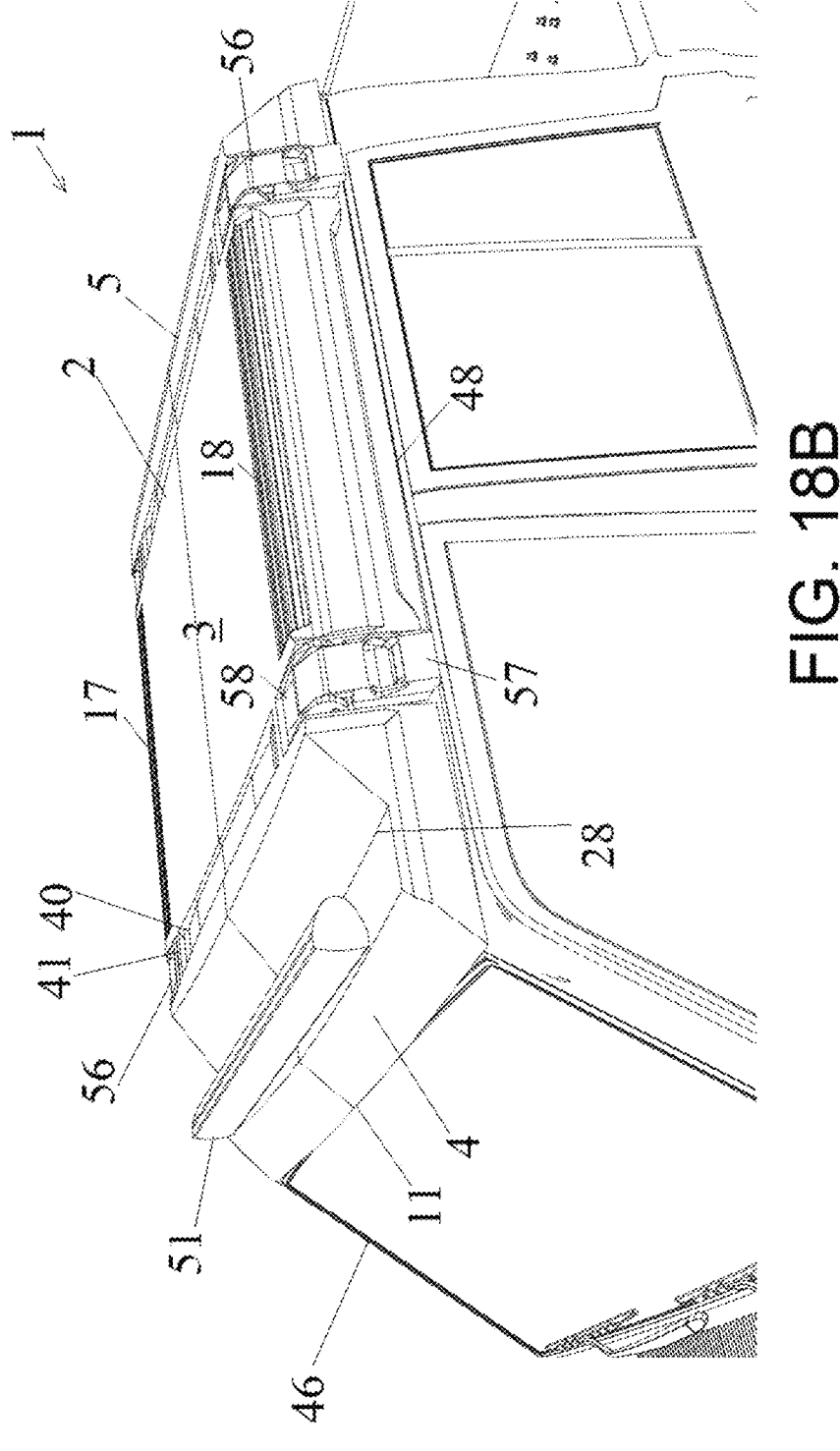
FIG. 18B shows a perspective view of the support platform of FIG. 16 with an alternative upper surface.
Figure 18C:
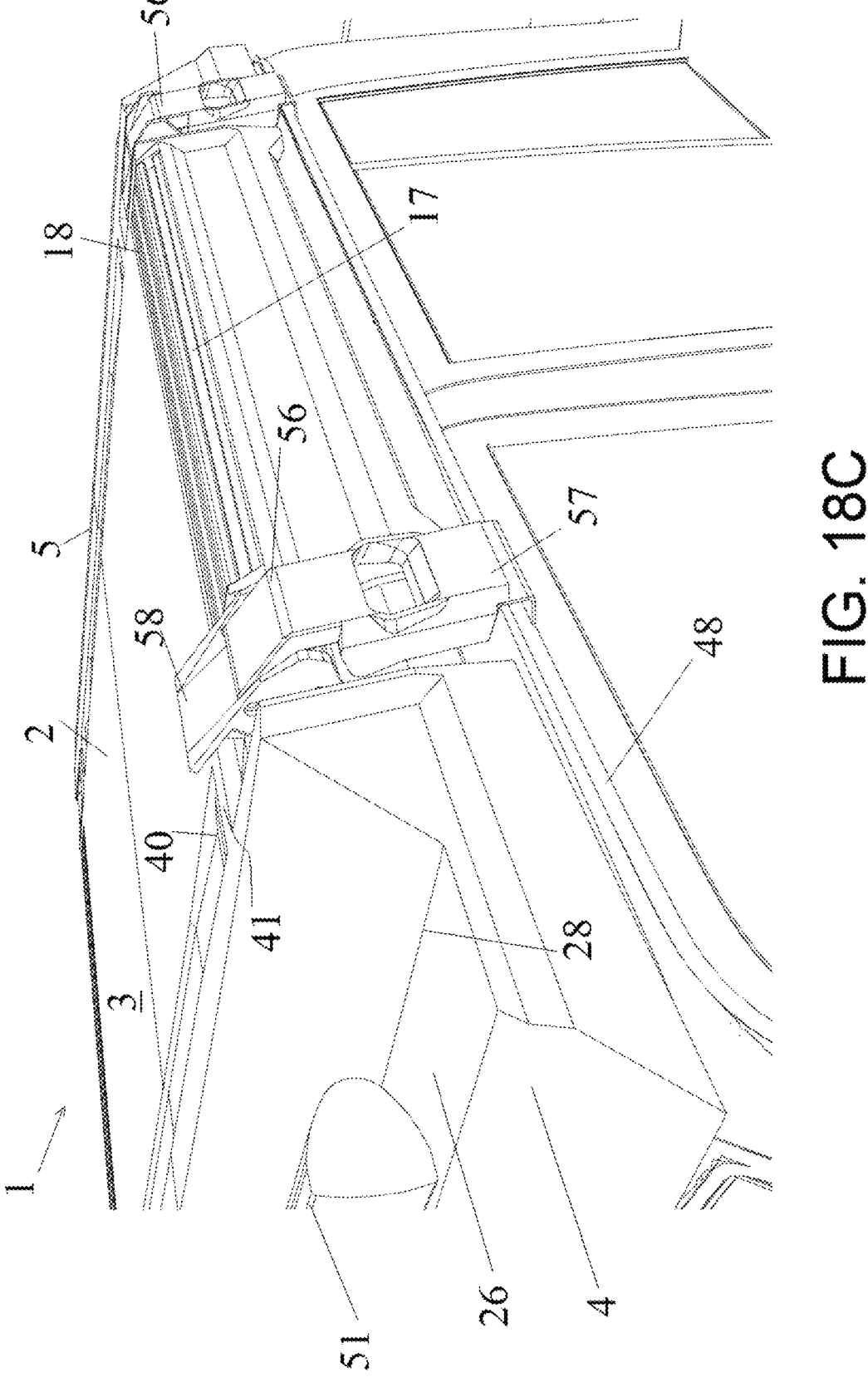
FIG. 18C shows part of the support platform of FIG. 18B.

It is noted the embodiment of platform 1 in FIG. 18A differs from that of FIG. 16 by removing the front and rear cross members 33. FIG. 18B shows a similar configuration except further including recess portions 40 each having a bridging member 41 adjacent each platform front mounting point 8. The embodiment of FIG. 18B does not include apertures 30 and has a substantially continuous upper surface 3. FIG. 18C shows the embodiment of FIG. 18B with end 57 of clip 56 disengaged from the mounting point.

Turning to the embodiment of FIGS. 19 to 23, there is shown a varied embodiment of the platform 1 of FIG. 9. As noted, for example, battery and associated solar electronics may be included in cutout container 52 and a lid or access hatch 60 may be added to the container 52. Latching means 53 are mounted to the body 2 to retain container 52 in place. Further, it will be appreciated an upper surface 54 of containers 52 is disposed parallel with upper surface 3 when located in cutouts 19.

In this embodiment, it can also be seen that shelf portion 26 is provided as a surround from the associated body portion and having no lower surface whereby a light bar 51 for example may be mounted by brackets. Further, additional cutout portions 61 are disposed near rear end 5 in upper surface 3. The cutouts 61 are in the form of an aperture similar to cutout 19 however they may be in the form of a tray. The cutouts 61 are adapted to retain communications equipment, power controllers and other ancillary equipment and preferably include an upper cover or lid 64.

Figure 19:
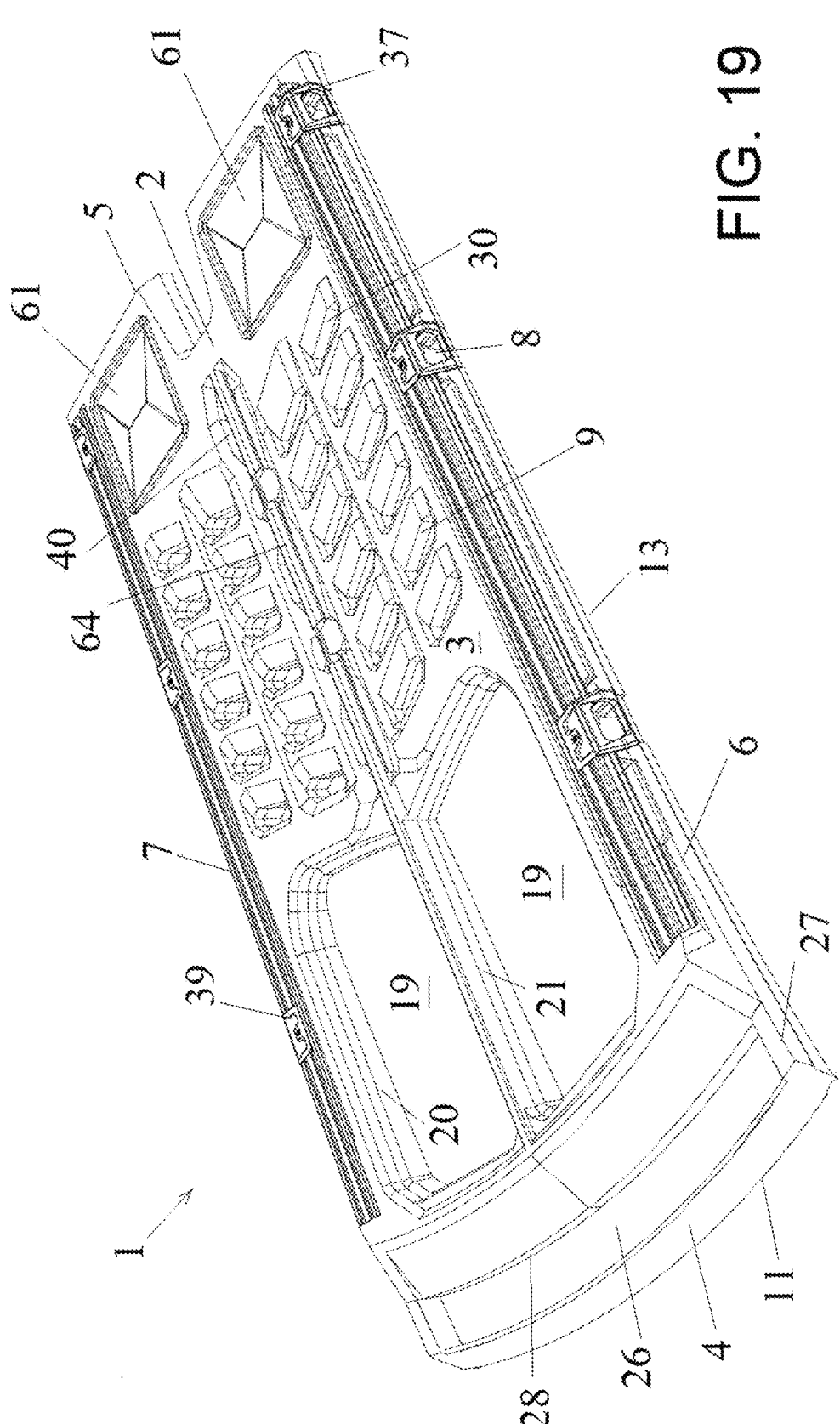
FIG. 19 shows an elevated perspective view of further preferred embodiment of the support platform.
Figure 20:
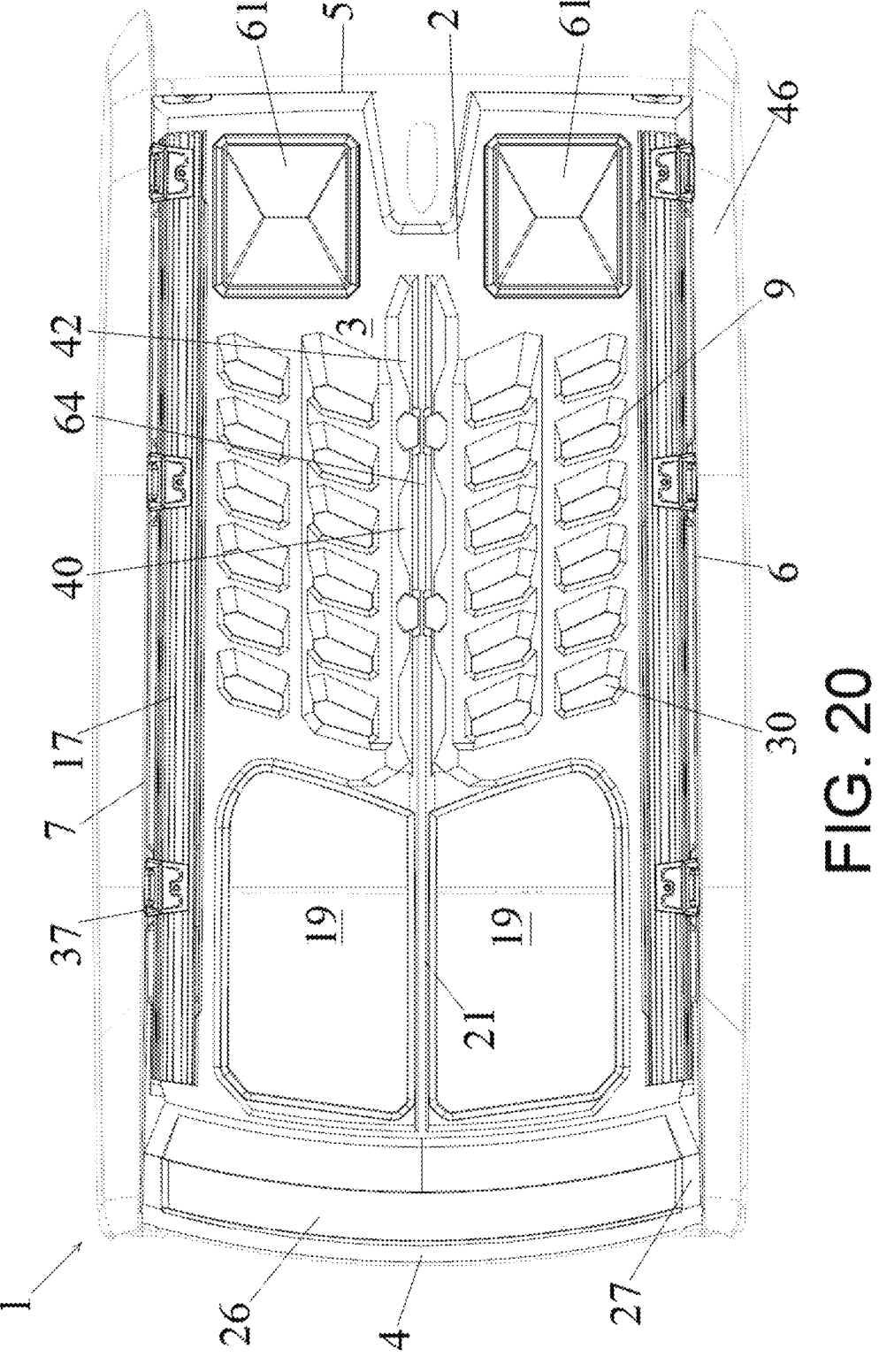
FIG. 20 is a plan view of the platform of FIG. 19.
Figure 21:
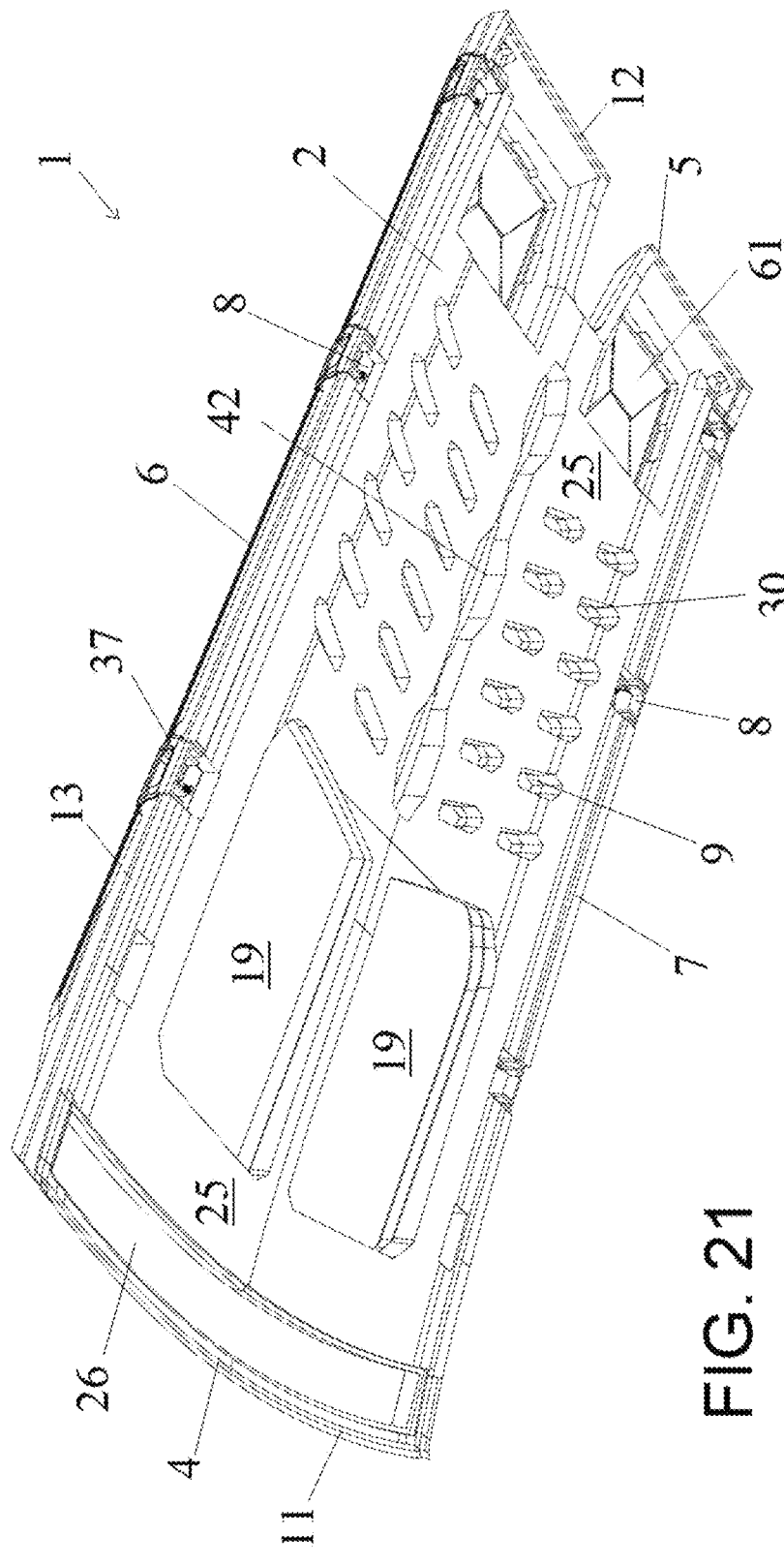
FIG. 21 is an underside perspective view of the platform of FIG. 19.
Figure 22:
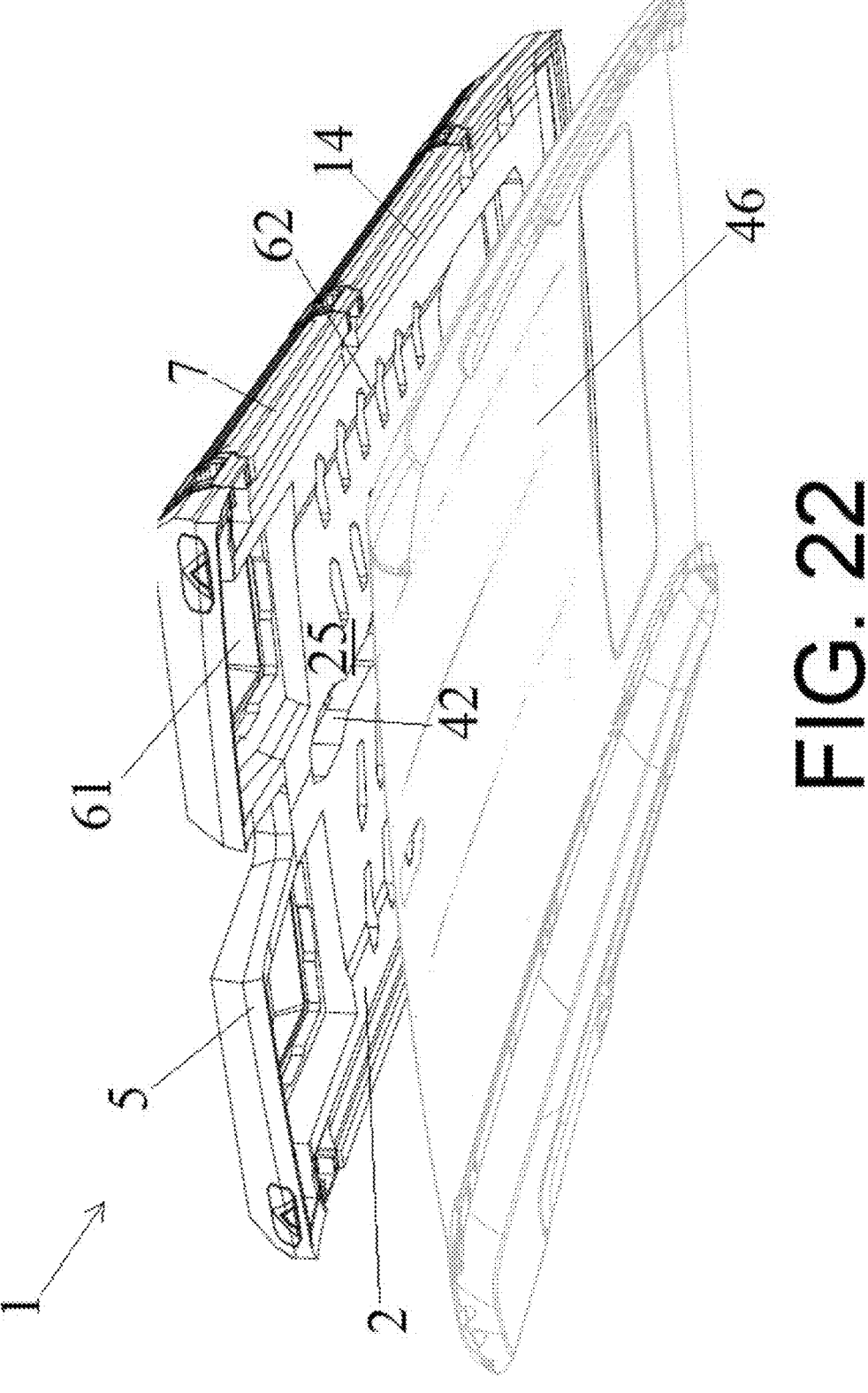
FIG. 22 is an underside perspective view of the platform of FIG. 17 adjacent a vehicle roof.
Figure 23:
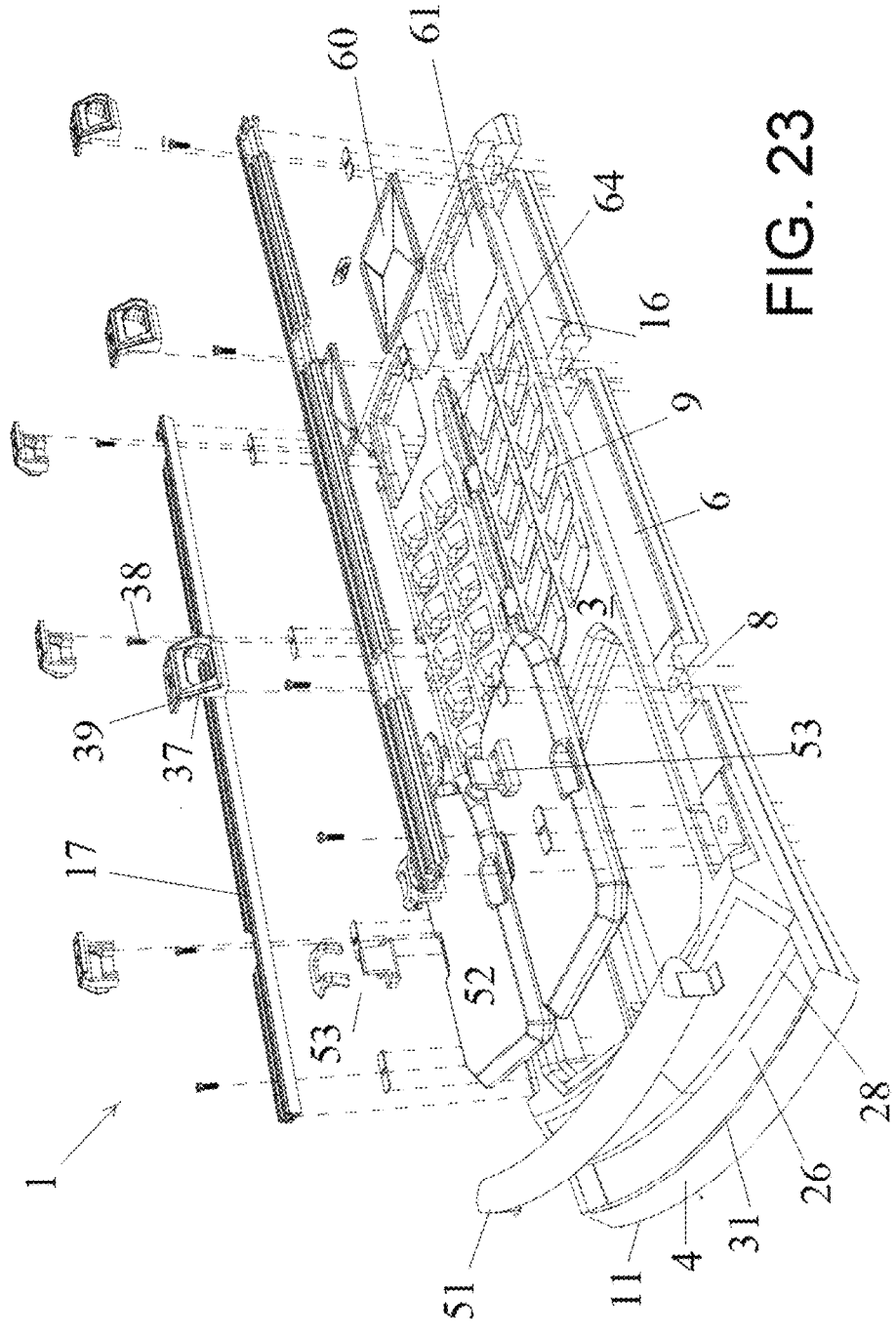
FIG. 23 is an elevated perspective exploded view of the platform of FIG. 19.

Yet further, the embodiment of FIG. 19 includes a spine member 64 extending longitudinally along a portion of the upper surface 3. Spine 64 is a bridge (formed from one or more sections) longitudinally extending down surface 3 and includes parallel recess portions 40 that in part extend through lower surface 25 with longitudinally spaced apart aperture portions.

A further preferred embodiment of the support platform 1 is shown in FIGS. 24 to 27. This embodiment is similar to that of FIG. 19 with addition of accessory recess 70 and filler caps 66. Particularly, filler caps 66 are disposed in upper surface 3 on each side of the platform intermediate cutout portions 19 and tie down apertures 30. The upper surface 3 further includes a pair of breather valves 67 disposed in upper surface 3 intermediate shelf portion rear 28 and cutouts 19. It can be seen tie down portions or handles 69 are formed intermediate longitudinal rail 17 and side portion 7.

Figure 24:
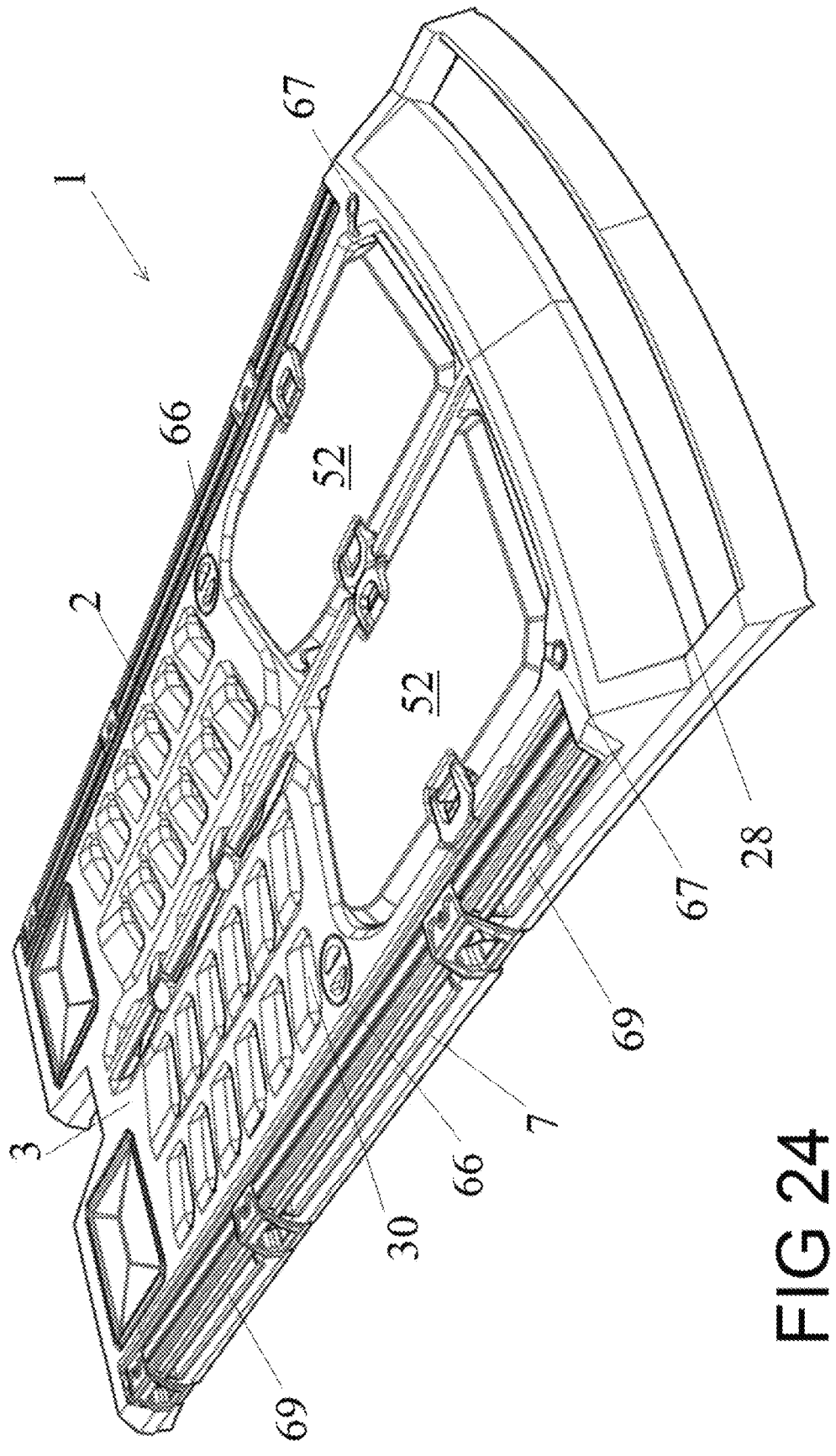
FIG. 24 is an elevated perspective view of a support platform according of another preferred embodiment.
Figure 25:
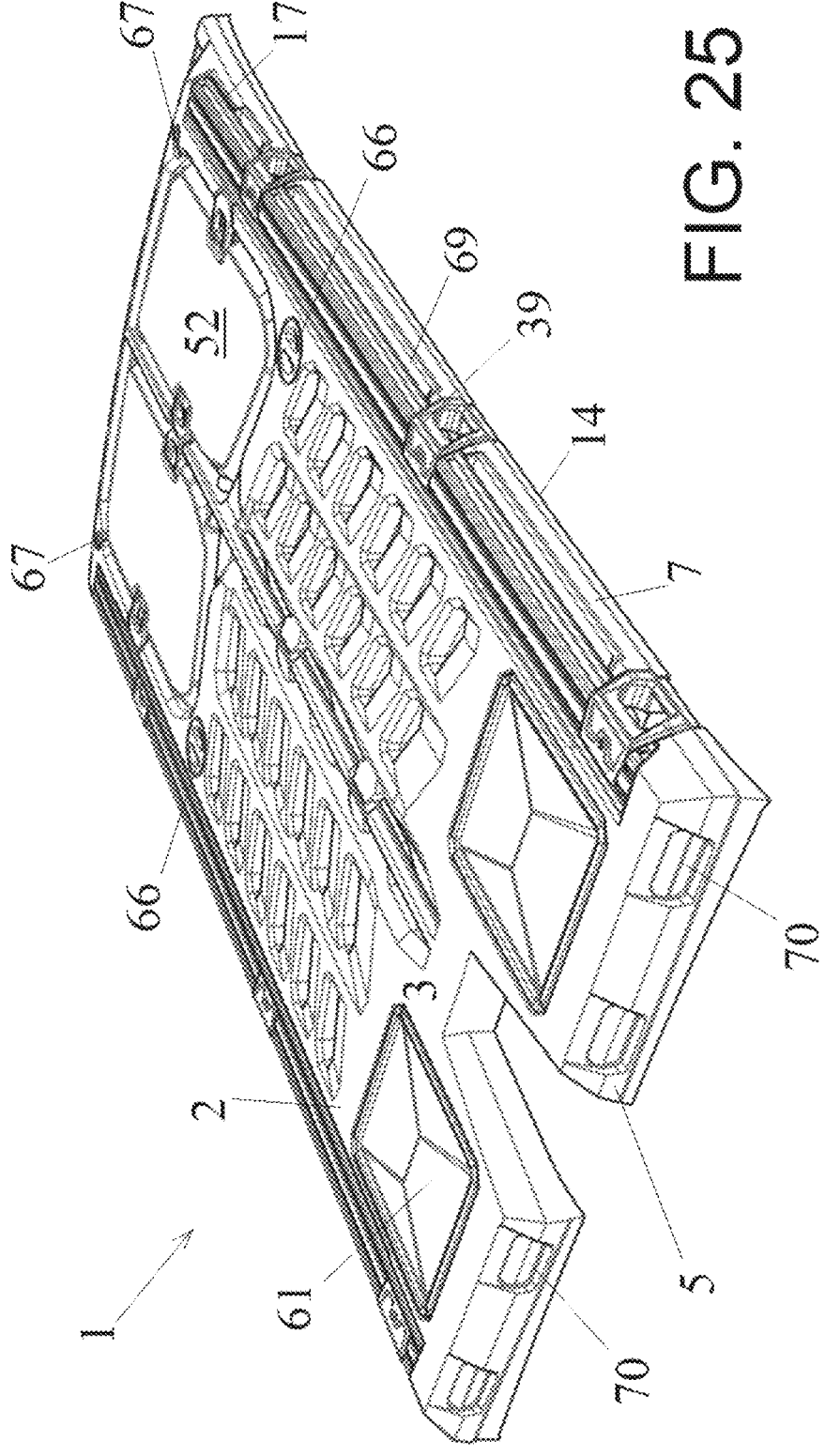
FIG. 25 is a rear elevated perspective view of the platform of FIG. 25.

FIG. 25 is the rear perspective view to FIG. 24 and shows accessory recesses 70 disposed in rear end 5 intermediate lower end 12 and upper surface 3. Recesses 70 are configured to retain lighting, cameras, ultrasonic sensors or other ancillary equipment. Four recesses 70 are shown in the embodiment of FIG. 24 and each recess 70 includes a body portion 72 recessed into rear end 5 of body 2. It will be appreciated the recesses can be disposed on any side or end of the platform 1.

Figure 26:
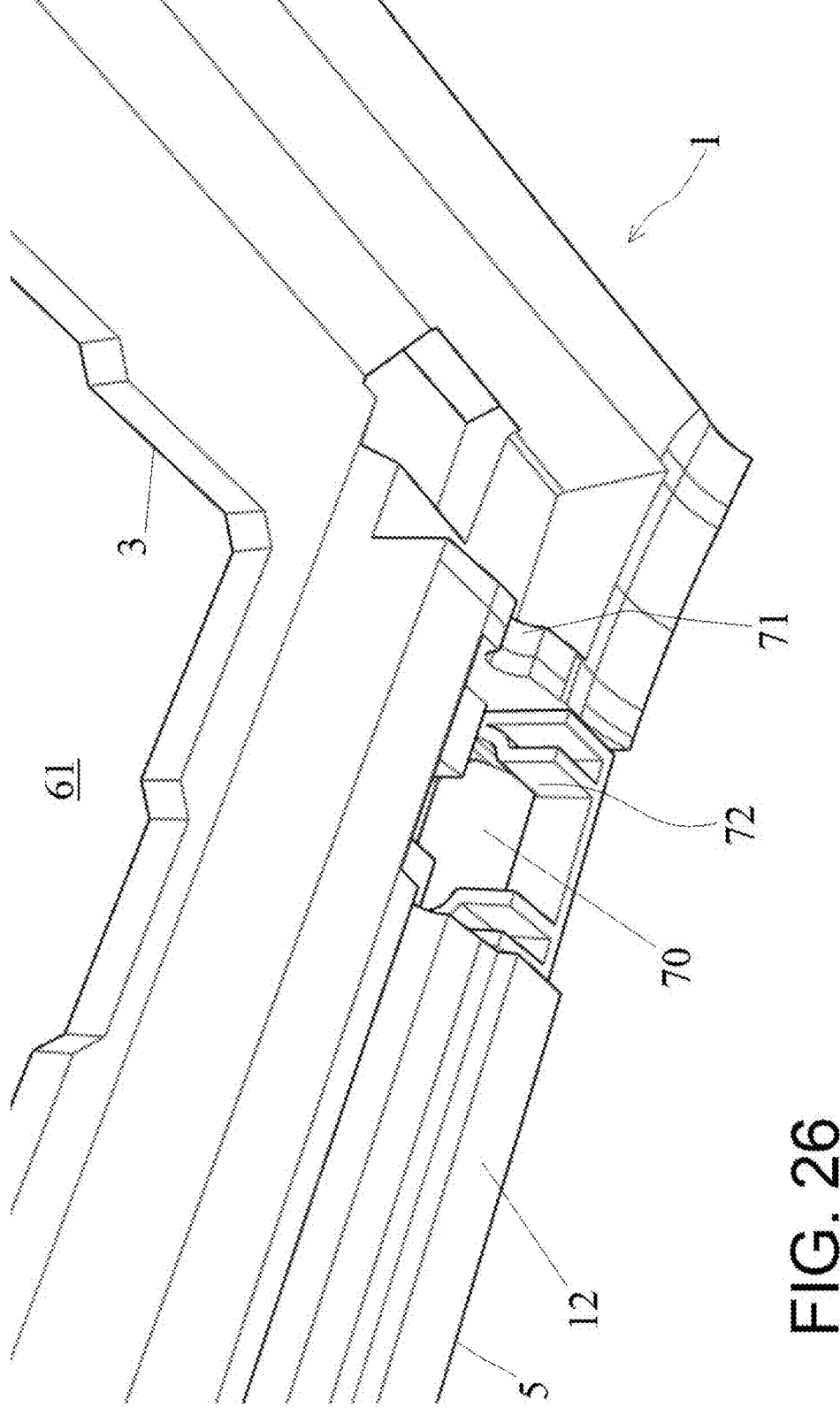
FIG. 26 is a close up view of a rear part of the platform of FIG. 24.
Figure 27:
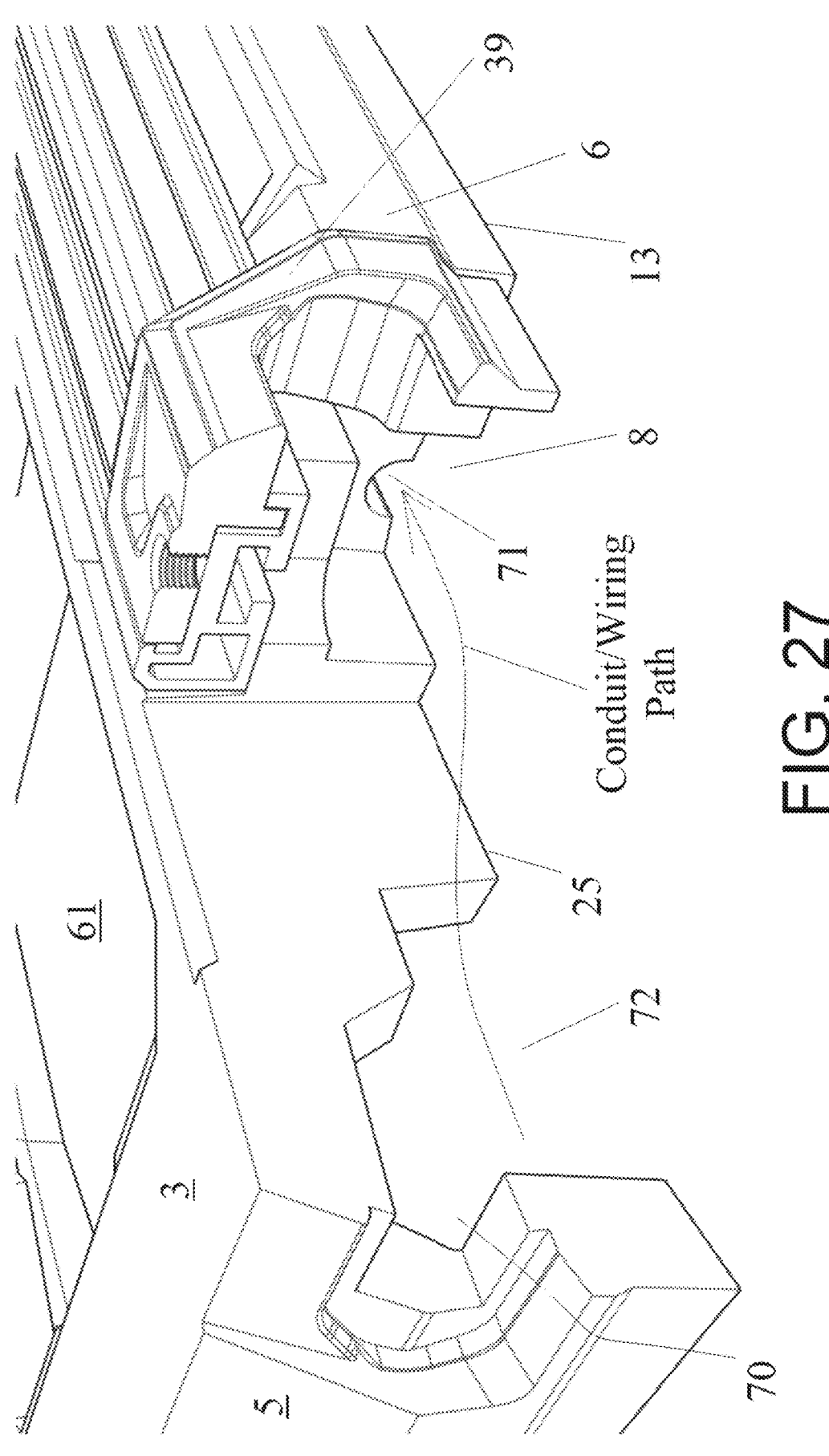
FIG. 27 is a cut-away view of the rear part of the platform shown in FIG. 26.

FIG. 26 is an underside perspective view showing recess body portion 72 having an adjacent conduit portion 71 configured to receive cabling or conduit from an accessory retained in recess 70. FIG. 27 is a partial cut-away of the embodiment of FIG. 26 showing a cable or conduit path to conduit portion 71 extending along an underside of platform 1 adjacent side 6.

The foregoing describes only preferred embodiments of the present invention and modifications, obvious to those skilled in the art, can be made thereto without departing from the scope of the present invention.

The term "comprising" (and its grammatical variations) as used herein is used in the inclusive sense of "including" or "having" and not in the exclusive sense of "consisting only of".

What is claimed is:

1. A vehicle roof support platform comprising:
   a unitary body having a load bearing upper surface adapted to extend over a roof of a vehicle, the upper surface bounded by spaced apart front and rear ends defining a length and spaced apart longitudinal sides intermediate respective ends defining a width;
   two or more mount locations spaced apart along each longitudinal side, each mount location adapted for use in securing the unitary body to a vehicle; and
   one or more spaced apart internal supports extending from an underside of the upper surface a predetermined distance away therefrom and terminating at a lower edge,
   wherein respective lower edges of the front and rear ends, the longitudinal sides and the internal supports conform and index to a shape of the vehicle roof such that the upper surface extends in a substantially horizontal plane.

2. The support platform according to claim 1 wherein the body includes a lower surface extending intermediate the lower edges of the front and rear ends and the lower edges of the longitudinal sides, the lower surface conforming to the shape of the vehicle roof such that the body defines a closed body volume.

3. The support platform according to claim 1 wherein the internal supports are solid, or are hollow defined by a cylindrical sidewall extending away from the upper surface.

4. The support platform according to claim 3 wherein the cylindrical internal supports include a step out at a predetermined depth.

5. The support platform according to claim 1 wherein the body along a predetermined length adjacent each longitudinal side includes a recess to receive a rail therein such that a rail upper surface is disposed substantially in the plane of the body upper surface.

6. The support platform according to claim 5 wherein each recess extends to respective longitudinal side walls such that the rail straddles an interface of each longitudinal side at the upper surface.

7. The support platform according to claim 1 wherein the upper surface includes a plurality of spaced apart cross-member recesses each to receive a cross-rail such that each cross-rail has an upper surface substantially in the plane of the upper surface.

8. The support platform according to claim 7 wherein the cross-member recesses are formed from a continuous recess section, or aligned discontinuous recess sections.

9. The support platform according to claim 1 wherein the upper surface includes one or more recess portions each having a bridging member.

10. The support platform according to claim 1 wherein the mounting locations include apertures through the body to fasten the body to the vehicle roof, or the mounting locations include an opening to receive a clamp to engage with a roof rain-gutter or upper edge of a vehicle door frame such that an upper face of the clamp is disposed in substantially the same plane as the upper surface.

11. The support platform according to claim 1 wherein the body includes at least one portion having a cut-out sidewall extending downwardly from the upper surface and forming an aperture therethrough.

12. The support platform according to claim 11 wherein cut-out sidewall is configured to seat one or more containers in the at least one cut-out such that upper surfaces of the one or more containers is in substantially the same plane at the upper surface.

13. The support platform according to claim 12 wherein the one or more containers are fluid containers or dry storage containers.

14. The support platform according to claim 2 wherein the body includes at least one cut-out portion having a cut-out sidewall extending intermediate the upper surface and the lower surface forming an aperture therethrough maintaining a closed volume.

15. The support platform according to claim 2 wherein the body includes one or more fluid apertures to receive or dispense fluid from the closed volume.

16. The support platform according to claim 2 wherein the lower surface includes one or more spaced apart drainage channels extending intermediate the front and rear ends.

17. The support platform according to claim 1 wherein the body includes a shelf portion disposed across the front of the body and extends a predetermined distance towards the rear of the roof, the shelf portion bounded each side by respective longitudinal sides.

18. The support platform according to claim 1 wherein the upper surface includes an array of raised members disposed thereover and the internal supports are configured to releasably receive a tread.

19. The support platform according to claim 2 wherein the lower surface includes one or more recesses adapted to retain apparatus including communications or pumps, and associated cable channel.

20. The support platform according to claim 1 wherein the body is moulded from a polyethylene or a polypropylene based plastic, or formed from a sheet metal material.

* * * * *